(12) United States Patent
Singh et al.

(10) Patent No.: US 10,498,718 B2
(45) Date of Patent: Dec. 3, 2019

(54) DEVICE IDENTIFICATION AND AUTHENTICATION IN A NETWORK

(71) Applicant: Amazon Technologies, Inc., Seattle, WA (US)

(72) Inventors: Bijendra Singh, Cedar Park, TX (US); Richard Dyson, Holmfirth (GB); Christopher Warren Jones, Louisville, KY (US); Praveen Kumar Madhanagopal, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 229 days.

(21) Appl. No.: 15/625,478

(22) Filed: Jun. 16, 2017

(65) Prior Publication Data

US 2018/0367518 A1 Dec. 20, 2018

(51) Int. Cl.
*H04L 29/08* (2006.01)
*H04L 29/06* (2006.01)
*G06F 21/44* (2013.01)
*H04L 9/32* (2006.01)

(52) U.S. Cl.
CPC .............. *H04L 63/08* (2013.01); *G06F 21/44* (2013.01); *H04L 9/3239* (2013.01); *H04L 63/06* (2013.01); *H04L 63/062* (2013.01); *H04L 63/0876* (2013.01); *H04L 63/10* (2013.01)

(58) Field of Classification Search
CPC ................................ H04L 63/08; G06F 21/44
USPC .......................................................... 726/7
See application file for complete search history.

(56) References Cited

U.S. PATENT DOCUMENTS

| | | | |
|---|---|---|---|
| 7,096,355 B1* | 8/2006 | Marvit | H04L 63/0428 380/264 |
| 9,781,305 B1* | 10/2017 | Ness | B41J 2/17546 |
| 2006/0010324 A1 | 1/2006 | Appenzeller et al. | |
| 2016/0359628 A1 | 12/2016 | Singh et al. | |

OTHER PUBLICATIONS

"Challenge-Response Authentication", Retrieved from the Internet: URL:https://en.wikipedia.org/wiki/Chall enge-response_authentication, Jan. 3, 2016, 1 pages.
"Digest Access Authentication", Retrieved from the Internet: URL:https://en.wikipedia.Org/w/index.php7title=Digest_access_authentication&ol did=650585396, Mar. 9, 2015, 7 pages.
PCT/US2018/036464 , "International Search Report and Written Opinion", dated Aug. 28, 2018, 16 pages.

* cited by examiner

*Primary Examiner* — Anthony D Brown
(74) *Attorney, Agent, or Firm* — Kilpatrick Townsend & Stockton LLP

(57) ABSTRACT

A network protocol is provided to identify and authenticate devices from different vendors that are deployed in a network. Each vendor is provided a vendor key unique to the vendor by a network management server. A vendor server associated with the vendor provisions a device with a first hash value generated using the vendor key among other device attributes. When the device is deployed in the network, the network management server queries the device. The device generates a second hash value using the first hash value and sends it in a response to the network management server. The network management server computes a local hash value using the vendor key and the attributes received from the response. The network management server authenticates the device if the local hash value matches with the second hash value.

19 Claims, 14 Drawing Sheets

| DEVICE ATTRIBUTES 700 | HASH FUNCTION IDENTIFIER LIST 212 | VENDOR IDENTIFIER 702 | DEVICE IDENTIFIER 704 | DEVICE CLASS 706 | MAC ADDRESS (OPTIONAL) 712 |
|---|---|---|---|---|---|
| | | | | MAC ADDRESS FLAG 710 | |
| | | | HASH FUNCTION IDENTIFIER 708 | | |

FIG. 7

DEVICE IDENTIFICATION AND AUTHENTICATION IN A NETWORK

BACKGROUND

In industrial environments, such as fulfillment centers, need for automation is constantly rising. Robotic devices, programmable logic controllers (PLCs), sorters, etc. have already been in use in fulfillment centers to help automate tasks. With advancement in Internet of Things (IoT), new smart and connected devices are deployed by different vendors in the same environment to automate their respective tasks.

In some cases, devices from different vendors may be deployed in a network operated and owned by an organization, e.g., a local area network (LAN). For example, the devices may communicate with a server computer over the network to perform different functions in an industrial environment. Identifying and authenticating all the devices associated with different vendors in the same environment that are using the same network is both network bandwidth and compute resource intensive. However, without proper identification and authentication of various devices in the environment, the risk of a rogue device gaining access to the network is significant and may increase without the implementation of proper network access control.

BRIEF DESCRIPTION OF THE DRAWINGS

Various embodiments in accordance with the present disclosure will be described with reference to the drawings, in which:

FIG. 7 illustrates device attributes associated with the device, in one embodiment;

DETAILED DESCRIPTION

Figure 1:
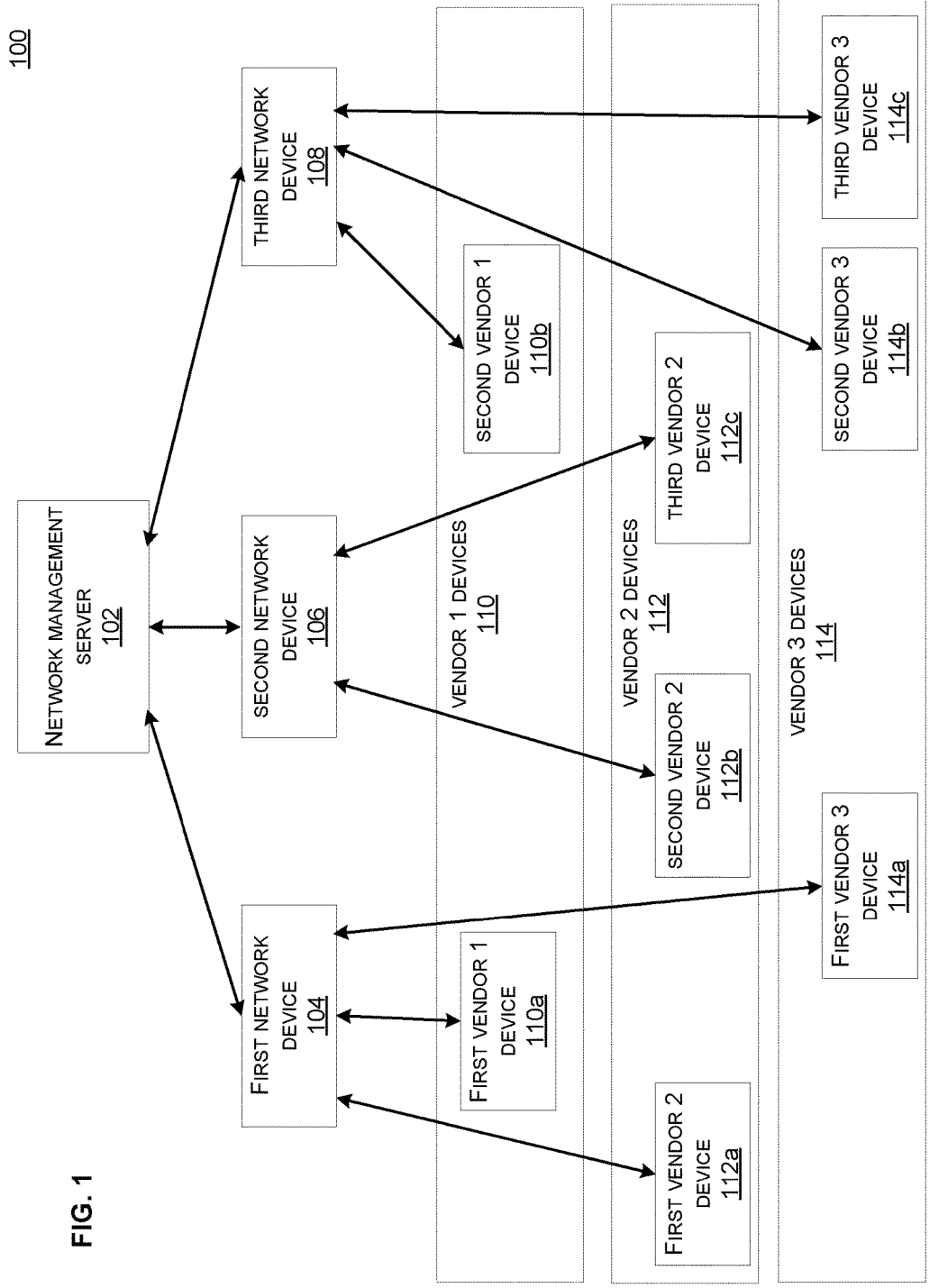
FIG. 1 illustrates an example of a system comprising a network management server communicatively coupled to various devices from different vendors over a network.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

In an industrial environment, different devices, e.g., robotic devices, programmable logic controllers (PLCs), sorters, or Internet of Things (IoT) devices, may be used in fulfillment centers. These devices may be used in a variety of capacities including automating certain tasks. These devices may be capable of communicating with a server computer over a network using an Internet Protocol (IP) or other protocols. For example, the network may be a local area network (LAN) or a virtual LAN that may be implemented at the fulfillment center of an organization. In most instances, various devices deployed in the network may be manufactured by different vendors.

In most instances, not all the devices deployed in the network may be trustworthy or can be positively identified. For example, in some instances identifying some of the devices may be difficult since not all the devices provided by different vendors may support a secure network access control (NAC) methodology. Generally, these vendor devices may not have advanced networking, security, and processing capabilities. For example, most of the vendor devices may have basic networking capabilities using transmission control protocol (TCP)/IP and may not support an advanced networking protocol like 802.1X. The 802.1X protocol is an Institute of Electrical and Electronics Engineers (IEEE) standard which can provide port-based network access control. The IEEE 802.1X may be used to provide an authentication mechanism using X509 digital certificates to devices wishing to attach to a network. However, not all the devices deployed in the network may support a network protocol like 802.1X since it may require additional software development and can be compute intensive. In addition, maintenance and distribution of security certificates to implement network access control for various devices from a large number of vendors can cause significant operational overhead resulting in the need for additional resources.

As the need for automation increases, a wide range of devices may be manufactured by different vendors to provide different functionalities and new vendor devices may be added to the network. Thus, the possibility of a rogue device gaining access to the network may increase due to the lack of a secure NAC methodology implemented by all the vendor devices that are added to the network. In some instances, the network may be owned and operated by an organization and unauthorized and rogue access to one network or a portion of the network by a rogue device may allow an unauthorized entry into other networks or businesses associated with the organization causing significant monetary damage and lack of trust among the clients of the organization. Thus, there is a need for a light-weight secure network access protocol which can be used to identify and authenticate all the vendor devices as they are deployed in the network without causing unnecessary operational and resource overhead.

Embodiments of the disclosed technologies can provide a light-weight secure network protocol to identify and authenticate various devices from different vendors that are deployed in a network. The network may be owned and operated by a single entity or a combination of entities with common security management. Each vendor that is pre-qualified (and hence trusted) to supply a device for deployment in the network may be provided with a vendor key unique to that vendor. The vendor may be provided a single vendor key or a separate vendor key for each device class supplied by that vendor. The vendor key may be securely stored in a vendor server associated with the vendor. The vendor server may compute a first hash value by performing a one-way hash function on first device attributes associated with the device. For example, the first device attributes may include the vendor key, a vendor identifier, a device class, a device identifier, and an optional media access control (MAC) address. Prior to the shipment of the device for deployment in the network, the device may be provisioned with the first hash value which may be stored in a secure memory location on the device. In this manner, the trust in the vendor by the network (or the network management server) may be extended to each device that is provisioned to be deployed in the network, by storing the respective first hash value in the respective device by the respective vendor.

When the device is deployed in the network, a network management server may detect the device on one of the ports and send a query message comprising a message identifier to the device to confirm the identity of the device. The device may generate a second hash value (also called a device hash value) using the one-way hash function on second device attributes. For example, the second device attributes may include the message identifier, an IP address assigned to the device, and the stored first hash value. The device may then send a response message comprising the second hash value to the network management server in response to the query message. The network management server may compute a third hash value by performing the one-way hash function on the first device attributes. The network management server may similarly duplicate the generation of the first hash value (that was also generated by the vendor) and the second hash value (that was also generated by the device) and verify that the received second hash value from the device matches the generated second hash value by the network management server. In this manner, by matching up the received and self-generated hashes, the network management device confirms that the device is authorized to be on the network by a trusted vendor.

It is to be noted, that the hash values are generated using one-way hash functions. One-way hash functions may also be referred to as a cryptographic hash functions. Hash functions take, as input, one or more component values and provide a fixed length hash value. A one-way hash function of good cryptographic strength generates a hash value from which it is computationally hard or close to impossible to derive the component values used in generating the hash value. In other words, the same hash value can be generated by any entity in possession of the same component values using the same one-way hash function. However, it is computationally hard or close to impossible to generate or determine any of the component values from the hash value itself, even if the one-way hash function used was known by the entity or even if some of the component values were known by the entity.

The first hash value is generated by the vendor server using the unique vendor key provided by the network management server in a vendor trusted facility and provisioned in the vendor device. The first hash value extends the trust instilled in the vendor by the network to the vendor device, without exposing or storing the unique vendor key on the vendor device. The second hash value is generated by the device after the device is deployed in the network and sent to the network management server. The second hash value is generated using the first hash value and other dynamic components (e.g., message identifier from the network management query) and assigned address of the device. The second hash value avoids exposing the first hash value to potential rogue devices on the network and also prevents replay attacks by potential rogue devices on the network. The network management device is in possession of all the component values to regenerate its own version of the first hash value and the second hash value and can therefore compare the received second hash value from the device against the generated second hash value to determine if the vendor device is to be allowed on the network.

FIG. 1 illustrates a system 100 comprising a network management server 102 communicatively coupled to various devices from different vendors via a network, e.g., an Internet Protocol (IP) network. In some embodiments, the network may be a local area network (LAN), part of a LAN or a virtual LAN implemented and operated by an organization associated with the network management server 102. In certain embodiments, the network of the system 100 may be similar to the network disclosed with reference to FIG. 14. In some instances, the system 100 may be used in industrial environments, e.g., fulfilment centers, warehouses, etc., where a wide range of devices from different vendors may be used to perform different functionalities, e.g., automation, IoT, etc. A vendor may be a manufacturer, a seller, or a supplier of the device. The vendor may be an individual or a company. Various components of the system 100 may be configured to communicate with each other using an appropriate IP protocol, e.g., IPv4 or IPv6. It will be understood that even though the embodiments are discussed using the IP network as an example, other network protocols may be supported by some embodiments without deviating from the scope of the disclosed technologies.

The network management server 102 may be coupled to vendor 1 devices 110, vendor 2 devices 112, and vendor 3 devices 114 via various network devices, e.g., a first network device 104, a second network device 106, and a third network device 108. The network devices may include one or more components similar to the network device disclosed in FIG. 13 and may include similar structure and functionality. The vendor 1 devices 110 may include a first vendor 1 device 110a and a second vendor 1 device 110b. The vendor 2 devices 112 may include a first vendor 2 device 112a, a second vendor 2 device 112b, and a third vendor 2 device 112c. The vendor 3 devices 114 may include a first vendor 3 device 114a, a second vendor 3 device 114b, and a third vendor 3 device 114c. Each of the vendor 1 devices 110, vendor 2 devices 112, and vendor 3 devices 114 may include different types or classes of devices. Some non-limiting examples of the vendor devices 110, 112, 114 may include robotic devices, programmable logic controllers (PLCs), sorters, IoT (Internet of Things) devices, etc. Each of the vendor devices 110, 112, or 114 may be capable of communicating over an IP network. In some embodiments, some or all of the vendor devices 110, 112, 114 may belong to different classes. For example, device classes may be categorized based on types of devices, functionalities supported by the devices, or any other suitable criteria.

The network management server 102 may communicate with the first vendor 1 device 110a, the first vendor 2 device 112a, and the first vendor 3 device 114a using the first network device 104. Similarly, the network management server 102 may communicate with the second vendor 2 device 112b, and the third vendor 2 device 112c using the second network device 106. Additionally, the network management server 102 may communicate with the second vendor 1 device 110b, the second vendor 3 device 114b, and the third vendor 3 device 114c using the third network device 108. In some embodiments, each of the vendor 1 devices 110, vendor 2 devices 112, and the vendor 3 devices 114 may be allocated a respective virtual local area network (VLAN).

The first network device 104, the second network device 106, and the third network device 108 may provide network connectivity to the vendor devices 110, 112, and 114. For example, in some implementations, the vendor devices 110, 112, and 114 may be wireless devices and each of the network devices 104, 106, and 108 may include a wireless access point (WAP) to allow network connectivity to the vendor devices 110, 112, and 114 with a wired network. In some implementations, each of the network devices 104, 106, and 108 may include or be coupled to a router, a switch, a hub, or any other suitable device needed to help provide network connectivity to the vendor devices 110, 112, and 114.

The vendor devices 110, 112, and 114 may include devices with limited power capacity and processing capability for supporting traditional network authentication protocols, such as the 802.1X protocol. Hence, the network in the system 100 may be vulnerable to unauthorized access by a rogue device due to the lack of implementation of a proper network access control for all the vendor devices deployed in the system 100. Embodiments of the disclosed technologies can provide a light-weight, but secure network protocol to identify and authenticate a device when the device is deployed in the system 100. As disclosed in further detail below, the secure network protocol can be implemented by all the vendors in their respective devices 110, 112, and 114 deployed in the system 100 and enforced by the network management system 102 to minimize unauthorized access to the network by a rogue device.

Figure 2:
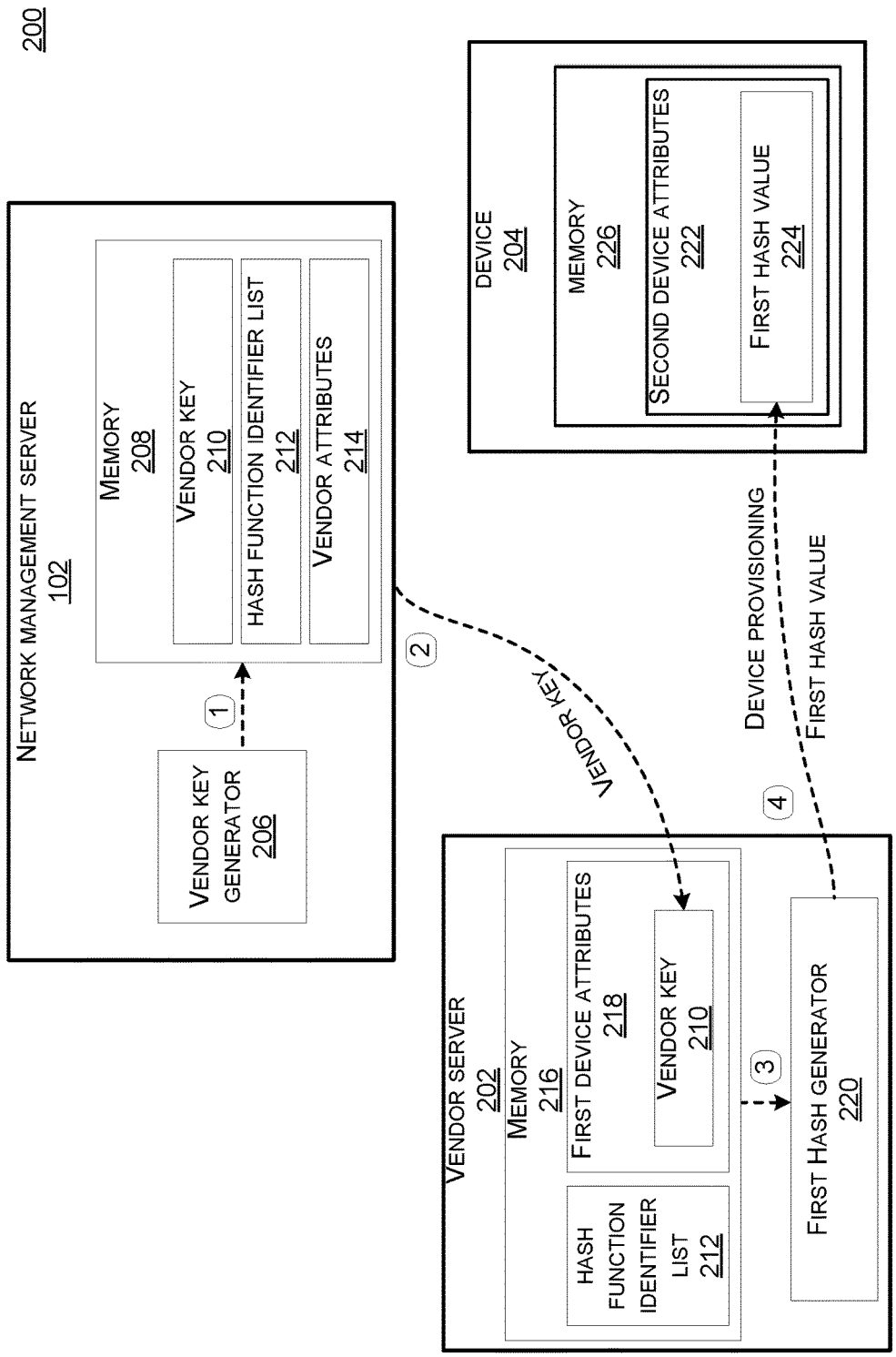
FIG. 2 illustrates a system for provisioning a device by a vendor server with a first hash value, in some embodiments of the disclosed technologies.

FIG. 2 illustrates a process 200 for provisioning a device 204 by a vendor. In certain embodiments, the vendor server provisions the device 204 with a first hash value generated using a vendor key provided by the network management server 102. In certain implementations, the vendor provisions the device 204 prior to deployment of the device in the network, similar to the network of system 100. For example, the vendor may provision the device 204 at a vendor location or a manufacturing facility.

The process 200 may include the network management server 102 in communication with the vendor server 202. The communication between the network management server 102 and the vendor server 202 may be through a secure wired or wireless communication channel or any other suitable medium. Each vendor that may be pre-qualified to supply a device for deployment in the network of system 100 may be assigned and provided a unique vendor identifier corresponding to all the devices associated with the vendor or multiple unique vendor identifiers associated with each respective device class for the vendor. For example, some vendors may have multiple device classes with each device class associated with its own unique vendor identifier. In some instances, generating different device classes allows segregation of management of different types of devices issued by the same vendor. The unique vendor keys are generated by the network management server 102 and provided to the vendor (i.e., vendor server 202) securely and secretly using known security protocols. Each vendor, upon receiving its unique vendor key(s) securely stores the vendor key(s) and maintains the vendor key(s) as a secret.

In some implementations, the network management server 102 may include a vendor key generator 206 and a memory 208. The vendor key generator 206 may be configured to generate a unique vendor key for each device class for each vendor. The memory 208 may store a vendor key 210 generated by the vendor key generator 206, a hash function identifier list 212, and vendor attributes 214. Note that the network management server 102 may include additional components which will be discussed in detail with reference to FIG. 4.

The vendor server 202 may include a memory 216 and a first hash generator 220. The memory 216 may store the hash function identifier list 212 comprising an enumerated list of one-way hash functions that may be used to compute a hash value. The enumerated list may include a list of one-way hash functions in an order or a sequence. In some implementations, the memory 216 may also store first device attributes 218 comprising a plurality of device attributes, and a vendor key provided by the network management server 102 using a secure method. Note that the vendor server 202 may include additional components which will be discussed in detail with reference to FIG. 5.

The device 204 may include a memory 226 comprising second device attributes 222. The second device attributes 222 may include a first hash value computed by the vendor server 202. Note that the device 204 may include additional components which will be discussed in detail with reference to FIG. 6. The device 204 may be one of the devices from the vendor 1 devices 110, vendor 2 devices 112, or vendor 3 devices 114 and the vendor server 202 may be associated with one or more devices from the vendor 1 devices 110, vendor 2 devices 112, or vendor 3 devices 114 as discussed with reference to FIG. 1.

In step 1, the vendor key generator 206 may generate a vendor key 210 unique to the vendor associated with the vendor server 202. The vendor key 210 may be generated using a random number generator, a pseudo-random number generator or any suitable cryptographic algorithm. In some implementations, each vendor key may be sixteen bytes long. The vendor key 210 generated by the vendor key generator 206 may be stored in the memory 208. In some embodiments, the vendor attributes 214 may include a vendor identifier and one or more device classes associated with the vendor. The vendor identifier may be used to identify a vendor. The device class may be used to identify a class to which the device belongs. In some embodiments, the vendor key 210 may be stored in a protected and a secure database which may require higher privileges (e.g., an administrator) in order to access the database. In some embodiments, the vendor identifier and optionally the device class may be used to look up the vendor key associated with a vendor.

The memory 208 may also store the hash function identifier list 212 which may be provided to each vendor. The hash function identifier list 212 may include an enumerated list of identifiers for a plurality of one-way hash functions that may be used for hash computation. In some implementations, the list of identifiers in the hash function identifier list 212 may include a "0" for "null", a "1" for "MD5", a "2" for "SHA-1", a "3" for "SHA-2", and a "4" may be reserved for future versions of the hash functions. For example, a value of "1" for a hash function identifier may indicate that the "MD5" may be used for the hash computation and a value of "2" for the hash function identifier may indicate that the "SHA-2" may be used for the hash computation. The hash function identifier list 212 may be updated from time to time and may be provided to the vendors on a timely basis so that the same one-way hash function can used by the network management server 102 and all the device vendors to compute the hashes. Hash functions take as input, one or more component values and provide a fixed length hash value. A one-way hash function of good cryptographic strength can generate a hash value from which it is computationally hard or close to impossible to derive the component values used in generating the hash value.

In some embodiments, a unique vendor key may be provided to the vendor for each device class using any secure method before the device is shipped. Referring back to FIG. 1, a first vendor key may be provided to a first vendor associated with the vendor 1 devices 110, and a second vendor key may be provided to a second vendor associated with the vendor 2 devices 112. As an example, if each of the vendor 3 devices 114 associated with a third vendor belong to different classes, then a separate unique key may be provided for each of the first vendor 3 device 114a, second vendor 3 device 114b, and the third vendor 3 device 114c.

In step 2, the vendor key 210 may be securely transmitted (or provided) by the network management server 102 to the vendor server 202. The vendor server 202 may be located at a vendor location or a manufacturing facility where the device 204 may be manufactured or prepared for shipping. The vendor server 202 may be configured to receive the vendor key 210 from the network management server 102 using a secure method. It will be noted that any secure method of transferring the vendor key 210 from the network management server 102 to the vendor server 202 may be used without deviating from the scope of the disclosed technologies. In some implementations, the vendor server 202 may store the vendor key 210 in a secure and protected memory associated with the vendor server 202. In some implementations, the first hash generator 220 may be configured to generate a first hash value by performing a one-way hash function on the first device attributes 218. The first device attributes 218 may include the vendor key 210 and a plurality of attributes associated with the device 204 as shown in FIG. 7.

Momentarily, referring to FIG. 7, FIG. 7 illustrates example device attributes 700 associated with the device 204, in one embodiment. Some of these attributes are used in generating the first hash value for device 204 by the vendor server 202.

The device attributes 700 may include the hash function identifier list 212, a vendor identifier 702, a device identifier 704, a device class 706, a hash function identifier 708, a media access control (MAC) address flag 710, and an optional MAC address 712. The vendor identifier 702 may include an identifier unique to the vendor. The vendor identifier 702 may include a four byte long integer value in big-endian format. In one implementation, the device identifier 704 for the device 204 may include a four byte long integer in big-endian format. In one implementation, the device class 706 associated with the device 204 may include a two byte short integer value in big-endian format. The hash function identifier 708 may identify the one-way hash function used from the hash function identifier list 212 to compute a hash value. The hash function identifier list 212 may be provided by the network management server 202 and may include an enumerated list of one-way hash functions that may be used to compute a hash value.

The MAC address flag 710 may be used to indicate if a MAC address of the device 204 may be used in hash computation. The MAC address may be used as a network address to communicate with a network using a network protocol such as Ethernet, Wi-Fi, etc. In some implementations, the MAC address 712 may be associated with a network interface card (NIC) and may be stored in a memory of the NIC. For example, some of the devices may include a NIC integrated with the device and therefore may have a burned-in MAC address assigned to them. Some other devices may include a NIC that can be replaced without affecting the functionality of the device and therefore the MAC address may change accordingly. In some implementation, if the MAC address flag 710 indicates a "1" or "true", the MAC address 712 of the device 204 may be used to calculate the first hash value 224. If the MAC address flag 710 indicates a "0" or "false", the MAC address 712 of the device 204 is not used to calculate the first hash value 224. The MAC address 712 may be in a six byte standard format stored as a hex value, e.g., "22-aa-bb-cc-dd-ee."

Referring back to FIG. 2, in step 3, the first hash value generator 220 may generate a first hash value 224 by performing a one-way hash function on the first device attributes 218. The first hash value 224 may be generated at the vendor's site to minimize unauthorized exposure of the vendor key. In some implementations, the first device attributes 218 used to compute the first hash value 224 may include the vendor key 210, the vendor identifier 702, the device class 706, the device identifier 704, and the optional MAC address 712. In certain implementations, the vendor key and the first device attributes 218 may be concatenated together prior to performing the one-way hash function on the concatenated value to generate a fixed length first hash value 224. In other implementations, each of the vendor key and the first device attributes 218 may be provided to the one-way hash function to generate the fixed length first hash value 224. In yet other implementations, a combination of techniques may be used in providing the values to the one-way hash function for generating the fixed length first hash value 224. The vendor server 202 (i.e., vendor) may determine the one-way hash function to use for generating the hash values and accordingly set the hash function identifier 708. In certain embodiments, the selection of the one-way hash function may be based on a negotiation with the network management server 102 and also based on the capabilities of the device 204 for also generating hashes using the selected one-way hash function. The one-way hash function may be selected from the hash function identifier list 212 stored in the memory 216 based on the selected hash function identifier 708. For example, the one-way hash function may be MD5, SHA-1, SHA-2, SHA-3, or any other cryptographic function supported by the device 204. If the MAC address flag 710 is set to "true" or "1", the first hash value 224 may be calculated as:

> One-way hash function{vendor identifier 702,device class 706,device identifier 704,optional MAC address 712,vendor key 210}=first hash value 224.   Equation (1)

If the MAC address flag 710 is set to "false" or "0", the first hash value 224 may be calculated as:

> One-way hash function{vendor identifier 702,device class 706,device identifier 704,vendor key 210}=first hash value 224.   Equation (2)

In step 4, the device 204 may be provisioned by the vendor server 202 with the first hash value 224. In some implementations, the first hash value 224 may be programmed in the device 204 during the manufacturing process. For example, the first hash value 224 may be programmed when an operating system (OS) is imaged to the device 204 or during re-imaging of the device 204. In some implementations, the vender server 202 may utilize a client application to program the device 204 with the first hash value 224. The client application may have administrative capabilities in the OS of the device 204 and may store the first hash value 224 in a secure location of the device 204, e.g., in a file with access restricted to only a privileged service or a daemon. For example, the first hash value 224 may be stored in a secure location in memory 226 and/or storage of the device 204. In some implementations, the vendor server 202 and/or the device 204 may also store the device attributes 700 for the device 204 in the memory 226 and/or storage of the device 204. For example, the device attributes 700 may be part of the second device attributes 222. As discussed with reference to FIG. 7, the device attributes 700 may include the hash function identifier list 212, vendor identifier 702, device identifier 704, device class 706, hash function identifier 708, MAC address flag 710, and the optional MAC address 712.

Once the device 204 is deployed in the network associated with the network management server 102, an Internet Protocol (IP) address may be assigned to the device 204 using any suitable network protocol, e.g., dynamic host configuration protocol (DHCP). In some implementations, an IP address may be assigned to the device 204 based on the IPv4 or IPv6 protocol version. In some implementations, a socket connection may be established with the device 204 using the IP address assigned to the device. The network management server 102 can now identify and authenticate the device 204 as discussed with reference to FIG. 3.

Figure 3:
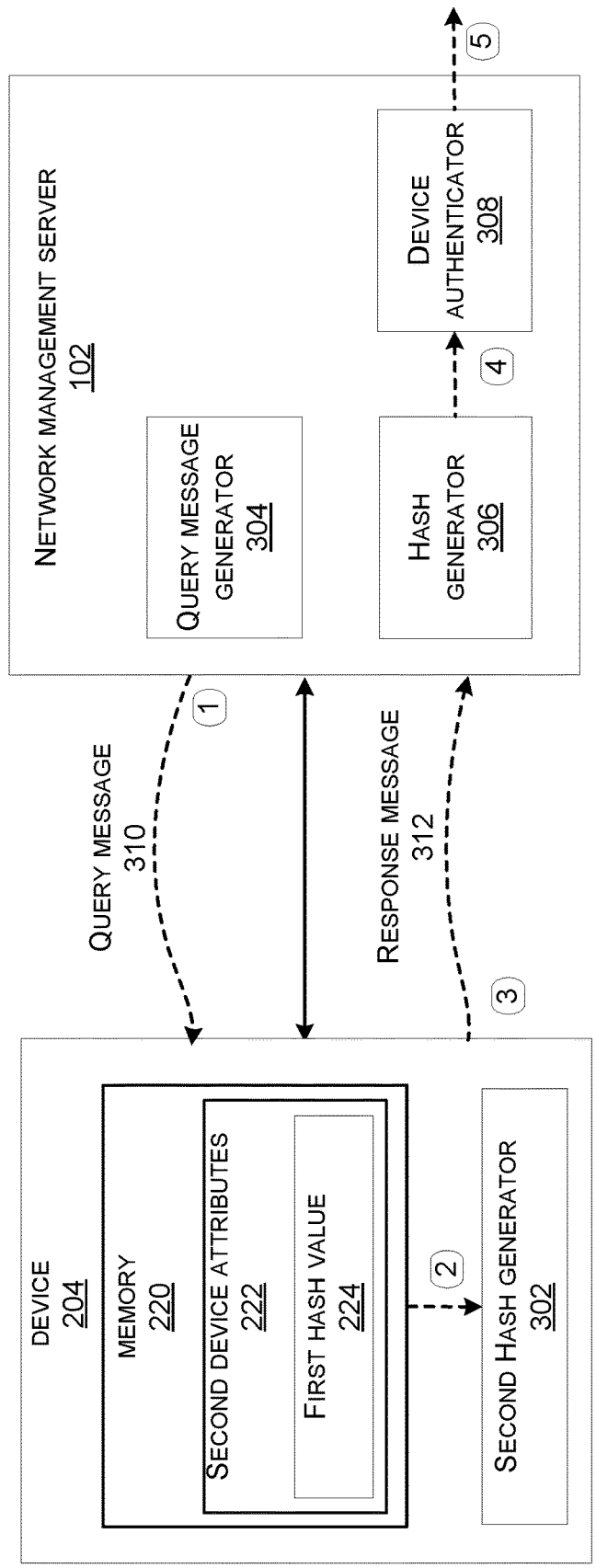
FIG. 3 illustrates a system for identifying and authenticating a device by the network management server, in some embodiments of the disclosed technologies.

FIG. 3 illustrates a system 300 for identifying and authenticating the device 204 by the network management server 102, in some embodiments of the disclosed technologies. The device 204 may be connected to the network management server 102 via a network device, e.g., the first network device 104, the second network device 106, or the third network device 108 as discussed with reference to FIG. 1. These network devices may be similar and may include one or more components similar to the network device disclosed with reference to FIG. 13.

In some embodiments, the device 204 may be connected to a specific port of the network management server 102. In some implementations, the vendor identifier 702, and optionally the device class 706 stored in the device 204 may be used to allocate a VLAN to each specific vendor. Based on the number of active devices at any given time for a certain vendor, it may be determined if the allocated IP address range may be sufficient to accommodate all the devices associated with that vendor. In some implementations, when a new device is deployed in the network, it may be assigned to an isolated VLAN to perform finger-printing. For example, finger-printing may refer to device identification and authentication using the protocol implemented by the network management server 102. In certain embodiments, finger-printing may also include measuring certain software modules associated with the device 204 and determining identity of certain hardware components of the device 204. In certain embodiments, the finger-print of the device may be compared against valid fingerprints of devices allowed on the network by the network management server 102 and/or the vendor server 202. In some embodiments, finger-printing may be performed at pre-determined intervals (e.g., daily or weekly) to ensure that all the devices in the network can be positively identified and no rogue devices have been installed.

In some implementations, the network management server 102 may include a query message generator 304, a hash generator 306, and a device authenticator 308. Note that the network management server 102 may include additional components as discussed with reference to FIG. 2 and later with reference to FIG. 4, which are not shown here for the purposes of simplicity.

In step 1, a query message 310 may be sent to the device 204 when the device 204 is detected by the network management server 102. For example, in some embodiments, when the device 204 is deployed in the network, the network management server 102 may detect the device 204 on a specific port. The query message generator 304 may be configured to generate the query message 310 to query the device 204. For example, in one implementation, the query message 310 may be a layer three (L3) network user datagram protocol (UDP) port query. The query message 310 may be transmitted in the form of a packet, as discussed with reference to FIG. 8A.

Figure 8:
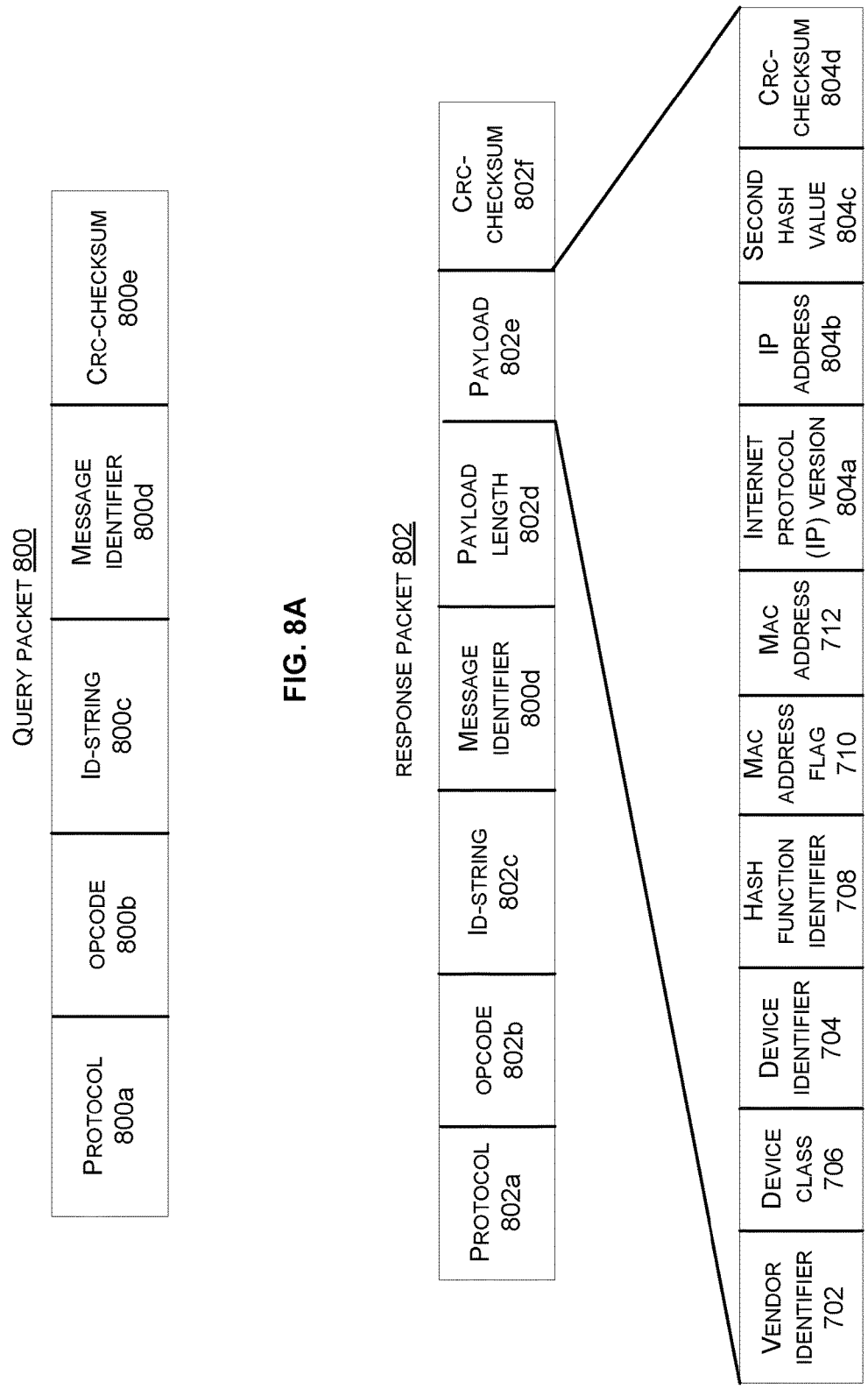
FIG. 8A illustrates an example query packet transmitted by the network management server to query a device deployed in the network, in some embodiments of the disclosed technologies.
FIG. 8B illustrates an example response packet transmitted by the device in response to the query message sent by the network management server, in some embodiments of the disclosed technologies.

Momentarily referring to FIG. 8A, FIG. 8A illustrates an example query packet 800 transmitted by the network management server 102 to query the device 204 when it is deployed in the network associated with the network management sever 102, in some embodiments of the disclosed technologies.

The query packet 800 may include a protocol 800a, an opcode 800b, an ID-string 800c, a message identifier 800d, and a cyclic redundancy check (CRC)-checksum 800e. In some implementations, the protocol 800a may be one byte long (e.g., 0x55) and may be used to identify a protocol used by the network management server 102. The opcode 800b may be one byte long and may be used to identify a type of the message. For example, a value of "0" for the opcode 800b may indicate "invalid", a value of "1" for the opcode 800b may indicate "query", a value of "2" for the opcode 800b may indicate "response", and all other values may be reserved. The ID-string 800c may be an identification field to identify a protocol name in octet representation of length six. The message identifier 800d may be four bytes long and may be used by the network management server 102 to match the query message with the received query response. In some implementations, the message identifier 800d may include a random number which can be monotonically increased or decreased so that the value of the message identifier 800d is unique within a certain time window. The CRC-checksum 800e may include an error detecting code and may be used for error detection and correction. In some implementations, the CRC-checksum 800e may be computed on the entire query packet 800 including the payload. In some embodiments, all fields of the query packet 800 may be transmitted in a big-endian format.

Referring back to FIG. 3, in step 2, a second hash generator 302 may generate a second hash value (also called a device hash value) using the one-way hash function on the second device attributes 222. The second device attributes 222 may include the first hash value 224 stored in the device 204, an IP address assigned to the device 204 at the deployment, and the message identifier 800d from the query message 310. The second hash value may be generated using the one-way hash function based on the hash function identifier 708. In some implementations, the client application executing on the device 204 may respond to the query packet 800 received in the query message 310. The client application may have authority to access the first hash value 224 stored in a secure location on the device 204. The client application may also be configured to select the appropriate one-way hash function based on the hash function identifier 708. In some implementations, the client application may use the first hash value 224 appended with the message identifier 800d received from the query packet 800 as an input to the selected one-way hash function, and the IP address of the device as a key to the one-way hash function to generate the second hash value. The second hash value may be sent to the network management server 102 in a response message 312.

In step 3, the device 204 may send the response message 312 in response to the query message 310 from the network management server 102. The client application may send the second hash value in the response message 312 along with a plurality of device attributes. In some implementations, the response message 312 may be in the form of a response packet as discussed with reference to FIG. 8B.

Momentarily referring to FIG. 8B, FIG. 8B illustrates an example response packet 802 transmitted by the device 204 in response to the query message 310 sent by the network management server 102, in some embodiments of the disclosed technologies.

The response packet 802 may include a protocol 802a, an opcode 802b, an ID-string 802c, the message identifier 800d, a payload length 802d, a payload 802e, and a CRC-checksum 802f. In some implementations, the protocol 802a may be similar to the protocol 800a, and the ID-string 802c may be similar to the ID-string 800c. The response packet 802 may include the message identifier 800d sent in the query packet 800. The opcode 802b may be "2" to indicate a response. The payload length 802d may be two bytes long and may indicate the length of the payload 802e. The CRC-checksum 802f may be used for error detection and correction. The CRC-checksum 804f may be computed on the entire response packet 802 including the payload 802e. In some embodiments, all the fields of the response packet 802 may be transmitted in a big-endian format.

The payload 802e may include some of the device attributes, e.g., the vendor identifier 702, the device class 706, the device identifier 704, the hash function identifier 708, the MAC address flag 710, the MAC address 712, an IP version 804a, an IP address 804b, a second hash value 804c, and a CRC-checksum 804d. The IP version 804a may be used to indicate the internet protocol version for the IP address. For example, a value of "4" for the IP version 804a may indicate IPv4 and a value of "6" for the IP version 804a may indicate IPv6. The IP address 804b may include the IP address assigned to the device 204 when the device 204 is deployed in the network. The second hash value 804c may be the second hash value generated by the second hash generator 302 using the first hash value 224, the IP address 804b, and the message identifier 800d.

Referring back to FIG. 3, the network management server 102 may be configured to receive the response packet 802 using a transceiver (not shown). The network management server 102 may access the memory 208 to retrieve the vendor key 210 using the received device identifier 704 from the response packet 802. In some embodiments, the device class 706 may also be used along with the device identifier 704 if different vendor keys were assigned for different device classes for that particular vendor. The network management server 102 may further identify the one-way hash function for hash computation based on the received hash function identifier 708 from the response packet 802.

In step 4, the hash generator 306 may generate a third hash value using similar steps as used by the vendor server 202 to generate the first hash value 224. Based on the MAC address flag 710 received in the response packet 802, the MAC address 712 may or may not be taken into account for the generation of the third hash value.

For example, if the MAC address flag 710 is set to "true" or "1", the third hash value may be calculated using:

One-way hash function{vendor identifier 702,device class 706,device identifier 704,MAC address 712,vendor key 210}=third hash value.  Equation (3)

If the MAC address flag 710 is set to "false" or "0", the third hash value may be calculated using:

One-way hash function{vendor identifier 702,device class 706,device identifier 704,vendor key 210}=third hash value.  Equation (4)

The hash generator 306 may be further configured to generate a fourth hash value using the third hash value and the message identifier 800d and a current IP address of the device 204 as shown below:

One-way hash function{third hash value+message identifier 800d,current IP address}=fourth hash value.  Equation (5)

The current IP address of the device 204 may be determined using the socket connection or a network connection handle to the device 204. Embodiments of the disclosed technologies use a current IP address of the device 204 in computing the fourth hash value instead of the IP address 804b received in the response packet 802 to minimize a replay attack. For example, in some instances, a rogue device may manage to snoop the traffic, copy the response packet 802 from the device 204 and send the response packet 802 to the network management server 102. The response packet 802 may include the IP address 804b assigned to the device 204, however, the current IP address of the rogue device sending the response packet may be different than the IP address 804b and hence the fourth hash value generated by the hash generator 306 may be different than the second hash value received in the response packet 802.

In step 5, the device authenticator 308 may compare the fourth hash value with the second hash value 804c received in the response packet 802. If there is a match, the device 204 may be positively identified and authenticated. If there is no match, the device 204 may not be authorized to join the network. In some implementations, the device 204 may be further authenticated by verifying the specific port where the device 204 may be connected based on the MAC address 712, IP address of the device 204, or the device identifier 704 of the device 204 in the access logs.

In some instances, a rogue device may manage to snoop the traffic, and copy the values from the query packet 800 or the response packet 802. The rogue device may include the IP address 804b from the response packet 802 and send its own response packet including the IP address 804*b* to the network management server 102. However, the message identifier in the response packet generated by the rogue device may include the message identifier 800*d* already used by the genuine device. If the message identifier is generated using a random number generator or by monotonically increasing or decreasing a number, it may take an almost infinite amount of time to repeat the same message identifier and hence the hash values generated by the network management server 102 and provided by the rogue device may not match resulting in the negative identification of the device.

In some instances, if a rogue device tries to duplicate an IP address of the device 204 while the device 204 is online, the misconfiguration of the IP addresses can be easily detected. In another instance, if a rogue device manages to copy the first hash value from a genuine device which is offline or destroyed, the device identifier associated with that genuine device can be invalidated in the database. Hence, any access by the rogue device using the first hash value can be denied thus minimizing the blast radius of the attack.

Figure 4:
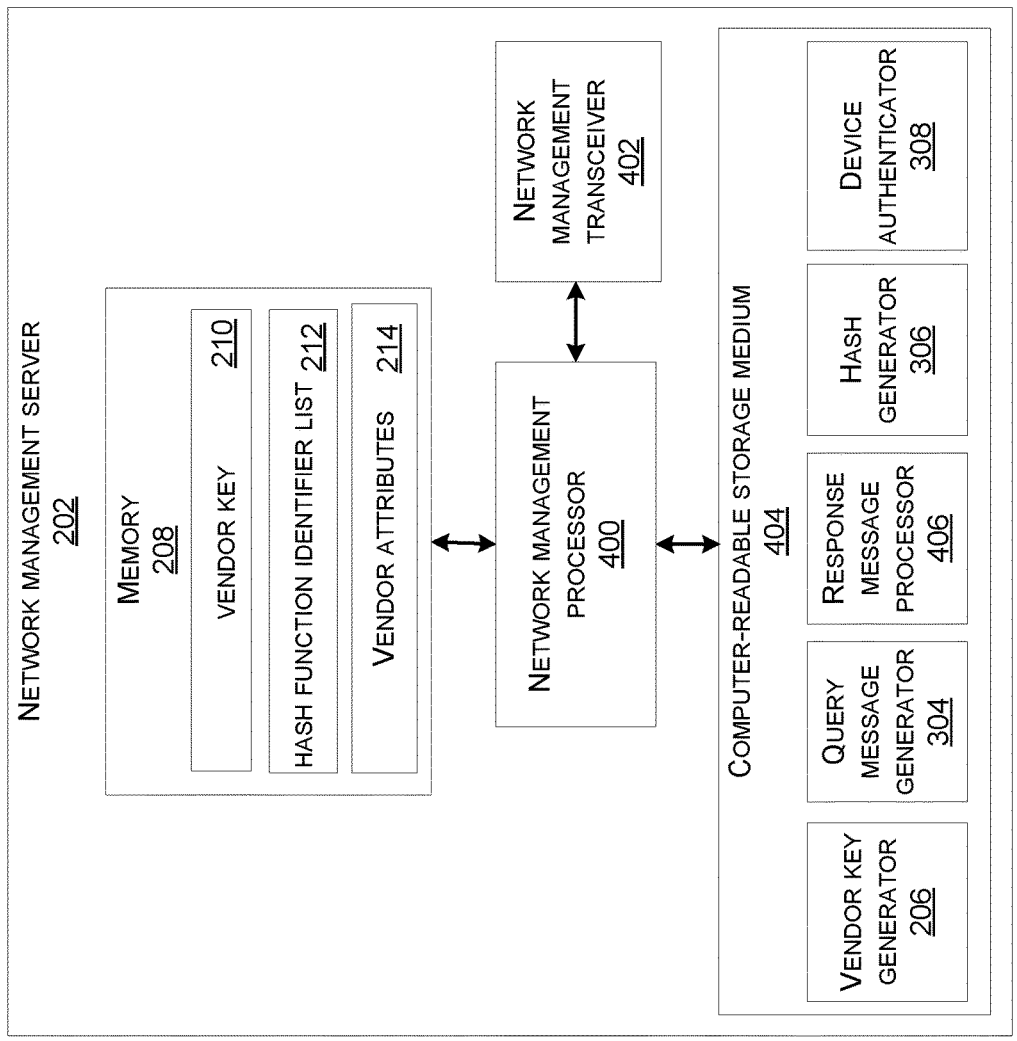
FIG. 4 illustrates a block diagram for the network management server in some embodiments of the disclosed technologies.

FIG. 4 illustrates a block diagram 400 for the network management server 102 in some embodiments of the disclosed technologies.

The network management server 102 may include a network management processor 400, a network management transceiver 402, the memory 208, and a computer-readable storage medium 404. Note that the block diagram 400 is for illustrative purposes only and the network management server 102 may include additional, fewer, or different components than shown in FIG. 4. Some of the components of the network management server 102 have been discussed with reference to FIG. 2 and FIG. 3 and are not discussed here again for the purposes of simplicity. Furthermore, the network management server 102 may include additional components discussed with reference to devices disclosed in FIG. 13 and FIG. 14.

The network management processor 400 may include a plurality of multiple processor cores or processing units within the same processor. The network management processor 400 may be configured to execute a plurality of instructions on one or more processors of the processor cores. The instructions may be stored on the computer-readable storage medium 404, for example, in the form of a computer program. The computer-readable storage medium 404 may be non-transitory. In some implementations, the computer-readable storage medium 404 may be part of the memory 208. Some of the non-limiting examples of the multi-core processors may include ARM's® cortex A57, MIPS®, AMD® Phenom, Intel® ATOM, etc.

The memory 208 may include RAM, ROM, Electrically Erasable Programmable Read-Only Memory (EEPROM), flash memory, or any suitable storage media. Note that the vendor key 210, the hash function identifier list 212, and the vendor attributes 214 are shown in the same memory 208 for the purposes of simplicity. However, in some implementations, the vendor key 210 may have restricted access as compared to the vendor attributes 214, the hash function identifier list 212 or other memory data, and thus may be stored in a secure and protected memory space. In some embodiments, the vendor key 210 may only be written or read by an administrative entity or a highly privileged entity.

The network management transceiver 402 may be configured as a transmitter or as a receiver to communicate with different components of the system 100 as shown in FIG. 1. For example, in some implementations, the network management transceiver 402 may communicate via a port of the network management server 102. In some embodiments, the network management transceiver 402 may be configured to communicate with different vendor servers for transmission of their respective vendor keys associated with each vendor server. In some embodiments, the network management transceiver 402 may be configured to communicate with different devices once the devices are deployed in the network for identification and authentication of each device. For example, in some implementations, the network management transceiver 402 may be used to send the query message 310 to the device 204 to confirm an identity of the device. For example, the query message 310 may be generated by the query message generator 304 and may include the message identifier 800*d*. The network management transceiver 402 may also be used to receive the response message 312 from the device 204 in response to the query message 310.

The computer-readable storage medium 404 may include the vendor key generator 206, the query message generator 304, a response message processor 406, the hash generator 306, and the device authenticator 308. The response message processor 406 may be configured to process the response message 312 received from the device 204 in response to the query message 310. For example, as discussed with reference to FIG. 8B, the response message processor 406 may receive the response packet 802 via the network management transceiver 402 in response to the query packet 800. The response message processor 406 may process the response packet 802 to determine various device attributes, e.g., the vendor identifier 702, the device class 706, the device identifier 704, the hash function identifier 708, the MAC address flag 710, the MAC address 712, the second hash value 804*c*, and the CRC-checksum 804*d*. The response message processor 406 may be also configured to retrieve the vendor key 210 based on the device identifier 804*d* and optionally the device class 706 stored in the memory 208.

The hash generator 306 may be configured to generate the third hash value using the device attributes from the response message processor 406 and the vendor key 210. The hash generator 306 may be further configured to generate a fourth hash value using the third hash value and the message identifier 800*d* from the response packet 802.

The device authenticator 308 may be configured to compare the fourth hash value generated by the hash generator 306 with the second hash value 804*c* received in the response packet 802 from the device 204 to positively identify the device 204. For example, if there is a match based on the comparison, the device 204 can be authenticated. In some implementations, once the device 204 is positively identified and authenticated, the device 204 can be assigned a new IP address. If there is no match based on the comparison, the device 204 may not be allowed in the network.

Figure 5:
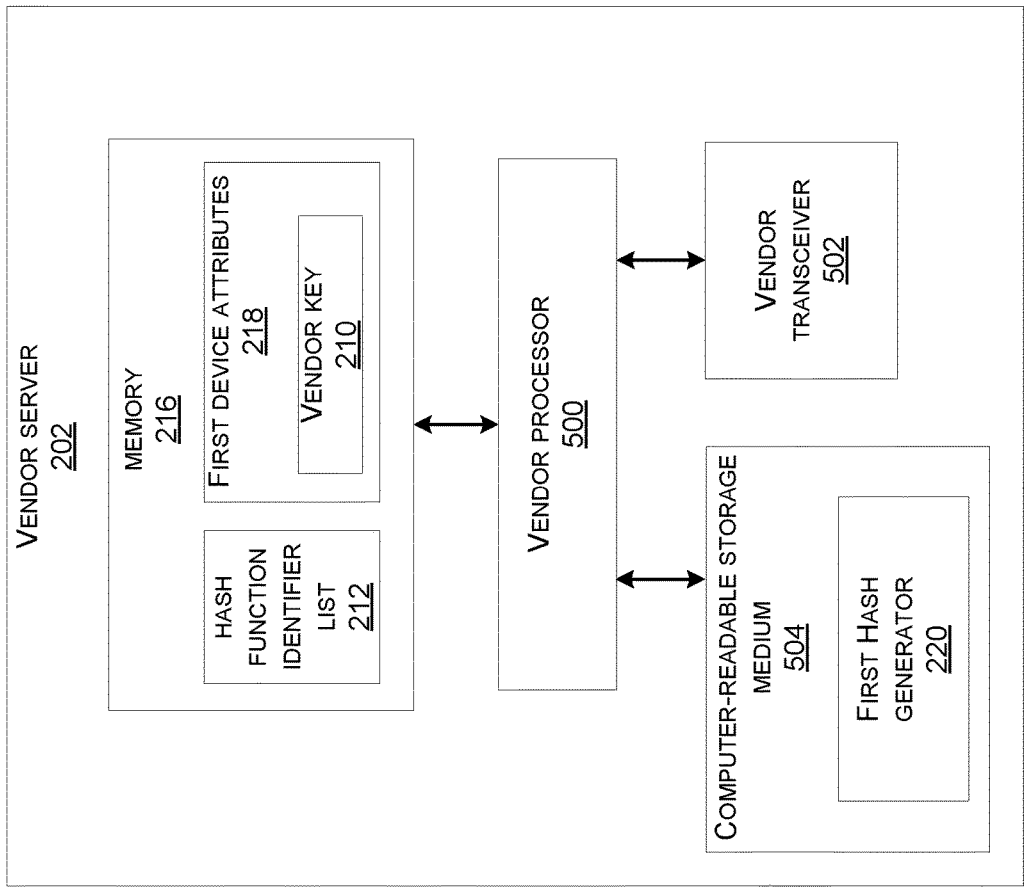
FIG. 5 illustrates a block diagram for a vendor server associated with a vendor of the device, in some embodiments of the disclosed technologies.

FIG. 5 illustrates a block diagram 500 for the vendor server 202 associated with a vendor of the device 204, in some embodiments of the disclosed technologies.

The vendor server 202 may include a vendor processor 500, a vendor transceiver 502, a computer-readable storage medium 504 and the memory 216. Note that the block diagram 500 is for illustrative purposes only and the vendor server 202 may include additional, fewer, or different components than shown in FIG. 5. Some of the components of the vendor server 202 have been discussed with reference to FIG. 2 and are not discussed here again for the purposes of simplicity. Furthermore, the vendor server 202 may include additional components discussed with reference to devices disclosed in FIGS. 13 and 14.

The vendor processor 500 may include a plurality of multiple processor cores or processing units within the same processor. The vendor processor 500 may be configured to execute a plurality of instructions on one or more processors of the processor cores. Some of the non-limiting examples of the multi-core processors may include ARM's° cortex A57, MIPS®, AMD® Phenom, Intel® ATOM, etc. The instructions may be stored on the computer-readable storage medium 504, for example, in the form of a computer program. The computer-readable storage medium 504 may be non-transitory. In some implementations, the computer-readable storage medium 504 may be part of the memory 216. The computer-readable storage medium 504 may include the first hash generator 220.

The memory 216 may include RAM, ROM, Electrically Erasable Programmable Read-Only Memory (EEPROM), flash memory, or any suitable storage media. Note that the vendor key 210, the first device attributes 218, and the hash function identifier list 212 are shown in the same memory 216 for the purposes of simplicity. However, in some implementations, the vendor key 210 may have restricted access as compared to the first device attributes 218, the hash function identifier list 212, or other memory data, and thus may be stored in a secure and protected memory space. In some embodiments, the vendor key 210 may only be written or read by an administrative entity or a highly privileged entity.

The vendor transceiver 502 may be configured as a transmitter or as a receiver to communicate with the network management server 102 or the device 204. In some embodiments, the vendor transceiver 502 may be configured to receive the vendor key 210 associated with the vendor server 202 from the network management server 102. The vendor transceiver 502 may also be configured to send the first hash value 224 to the device 204 for provisioning the device 204 before the device 204 is shipped.

Figure 6:
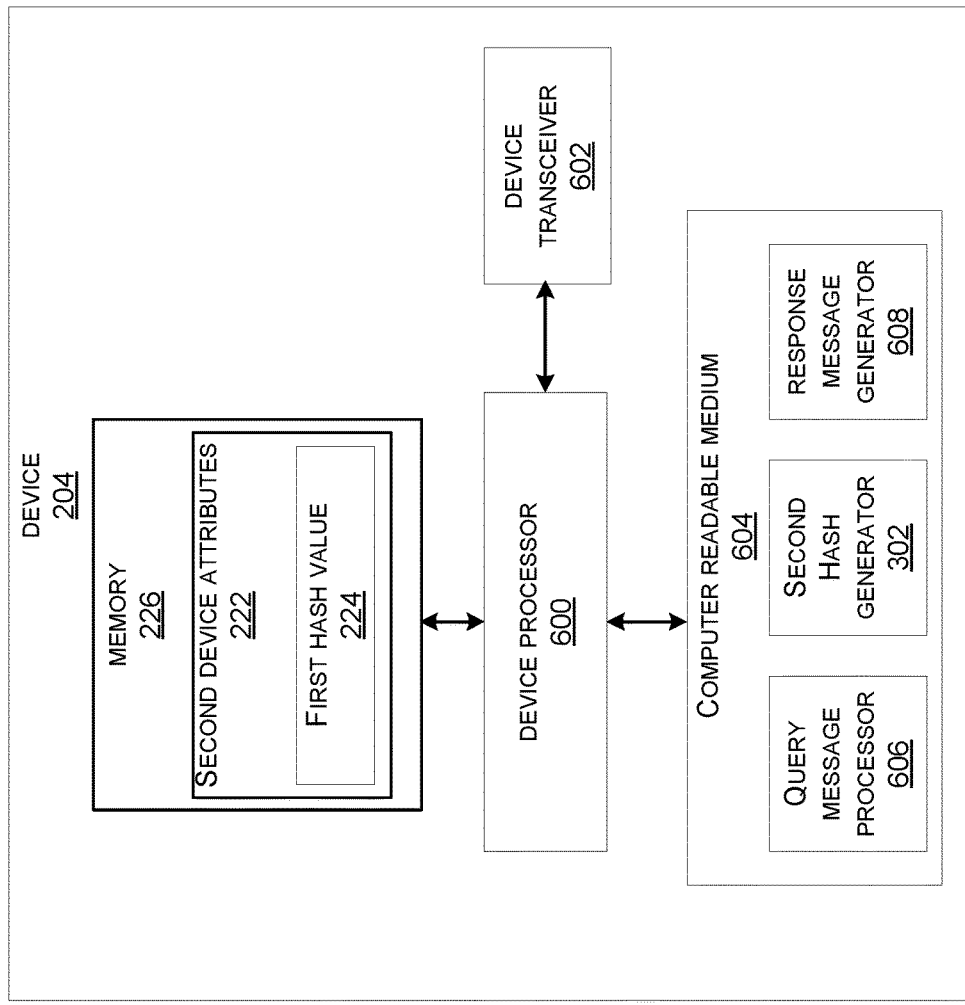
FIG. 6 illustrates a block diagram for the device, in some embodiments of the disclosed technologies.

FIG. 6 illustrates a block diagram 600 for the device 204, in some embodiments of the disclosed technologies.

The device 204 may include a device processor 600, a device transceiver 602, a computer-readable storage medium 604, and the memory 226. Note that the block diagram 600 is for illustrative purposes only and the device 204 may include additional, fewer, or different components than shown in FIG. 6. Some of the components of the device 204 have been discussed with reference to FIG. 2 and FIG. 3 and are not discussed here again for the purposes of simplicity. Furthermore, the device 204 may include additional components discussed with reference to devices disclosed in FIG. 13 and FIG. 14.

The device processor 600 may include a plurality of multiple processor cores or processing units within the same processor. The device processor 600 may be configured to execute a plurality of instructions on one or more processors of the processor cores. Some of the non-limiting examples of the multi-core processors may include ARM's® cortex A57, MIPS®, AMD® Phenom, Intel® ATOM, etc. The instructions may be stored on the computer-readable storage medium 604, for example, in the form of a computer program. The computer-readable storage medium 604 may be non-transitory. In some implementations, the computer-readable storage medium 604 may be part of the memory 226. The memory 226 may include RAM, ROM, EEPROM, flash memory, or any suitable storage media.

The computer-readable storage medium 604 may include a query message processor 606, the second hash generator 302, and a response message generator 608. In some embodiments, the query message processor 606, the second hash generator 302, and the response message generator 608 may be part of the client application executing on the device 204.

The query message processor 606 may be configured to process the query packet 800 received from the network management server 102 as discussed with reference to FIG. 3. In some embodiments, the query packet 800 may be received via a L3 network UDP port. In some embodiments, the query message processor 606 may parse the query packet 800 to identify different fields of the query packet 800. For example, the query message processor 606 may identify that the query message 310 includes a query request based on the opcode 800b received in the query packet 800. The query message processor 606 may further determine a value of the message identifier 800d which may be copied in the response message 312.

The response message generator 608 may be configured to generate the response message 312 to be sent to the network management server 102 as discussed with reference to FIG. 3. In some embodiments, the response message generator 608 may determine the device attributes 700 along with the second hash value 804c generated by the second hash generator 302 to be sent in the response packet 802. The response message generator 608 may also include the message identifier 800d from the query message 310 in the response packet 802 so that the response packet 312 can be matched with the query packet 800 by the network management server 102.

Figure 9:
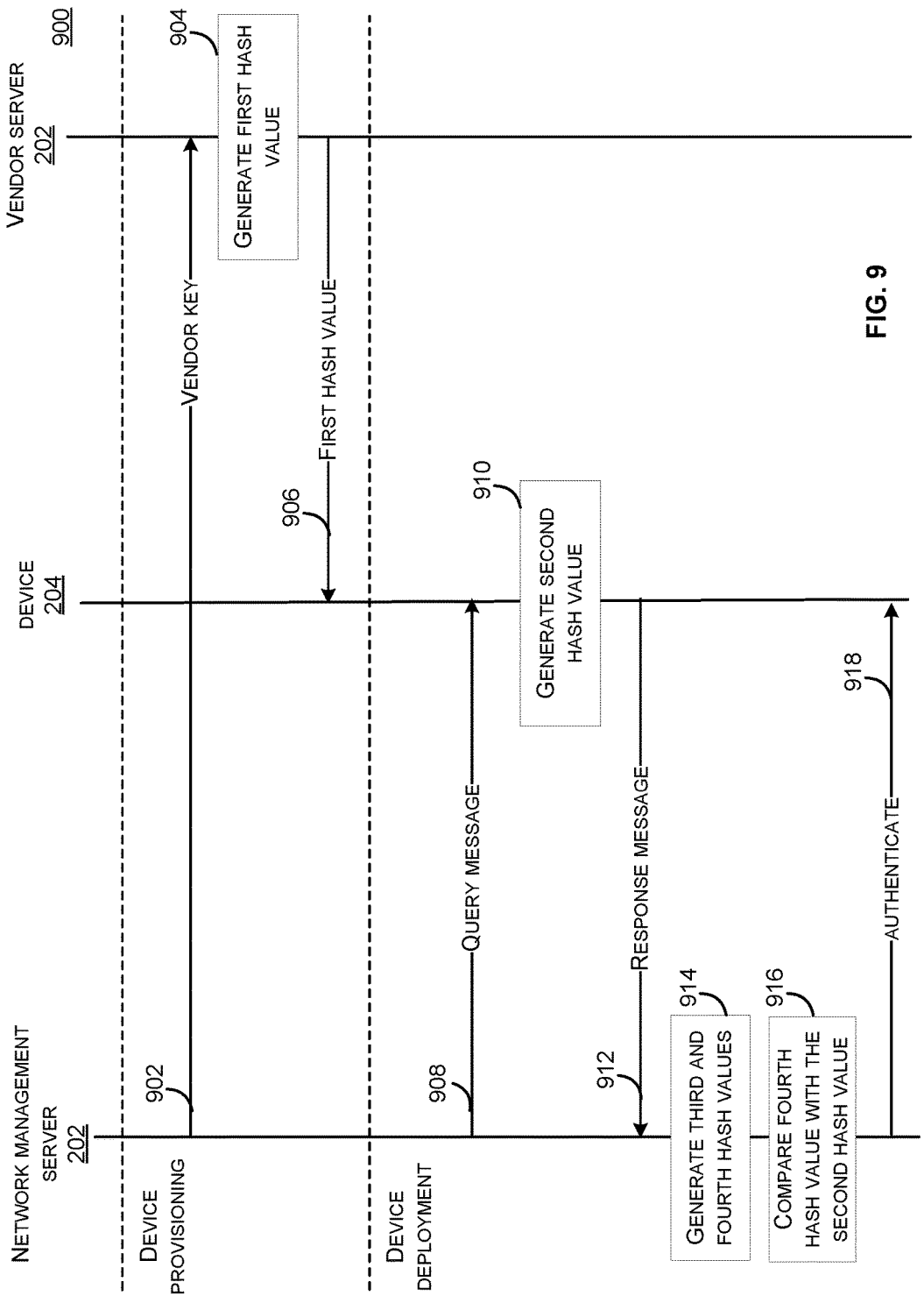
FIG. 9 illustrates a flow diagram for identification and authentication of a device in a network, in some embodiments of the disclosed technologies.

FIG. 9 illustrates a flow diagram 900 for identification and authentication of a device in a network, in some embodiments of the disclosed technologies. For example, the device may be the device 204 supplied by a vendor associated with the vendor server 202.

The flow diagram 900 shows steps 902, 904, and 906 which may be performed at a vendor location before the device is shipped for deployment in a network. The flow diagram 900 also shows steps 908, 910, 912, 914, and 916 which may be performed once the device is installed in the network associated with the network management server 102.

In step 902, the network management server 102 may provide a unique vendor key to the vendor server 202 using a secure method. Referring back to FIG. 4, the vendor key may be the vendor key 210 generated by the vendor key generator 206. The vendor key 210 may be transmitted to the vendor server 202 by the network management transceiver 402. The vendor key 210 may also be stored in a secure location in the memory 208 to be used for identification and authentication of the device 204 once the device 204 is deployed in the network. The network management server 102 may also store the vendor attributes 214 comprising the vendor identifier 702 and optionally the device class 706 in the memory 208. The network management server 102 may also provide the hash function identifier list 212 to the vendor server 202 that may be used to identify the one-way hash function used for computing the hash values.

In step 904, a first hash value may be generated by the vendor server 202. Referring back to FIG. 5, the vendor key 210 may be received by the vendor server 202 using the vendor transceiver 502. The vendor server 202 may store the vendor key 210 in a secure location. The vendor server 202 may also store the hash function identifier list 212 and the device attributes 700 in the memory 216. The first hash generator 220 may generate the first hash value 224 based on the value of the MAC address flag 710 as shown in equation (1) and equation (2).

In step 906, the device 204 is provisioned with the first hash value 224. In some implementations, the first hash value 224 may be programmed in the device 204 during the manufacturing process when an operating system (OS) is imaged to the device 204. In some implementations, the vender server 202 may utilize a client application with administrative capabilities to program the device 204 with the first hash value 224.

Once the device 204 is programmed with the first hash value 224, it can be installed in the network associated with the network management server 102. An IP address may be assigned to the device 204 using any suitable method, e.g., DHCP. In some implementations, the device 204 may be assigned to a VLAN to perform finger printing.

In step 908, the query message 310 may be sent to the device 204 to confirm an identity of the device 204 when the network management server 102 detects the device 204 on one of the ports. In some embodiments, the query message 310 may include a L3 network UDP port query to a particular port the device may be detected. The query message may include the query packet 800 as discussed with reference to FIG. 8A. Referring back to FIG. 4, the query message generator 304 may generate the query message 310 to be sent to the device 204 via the network management transceiver 402.

In step 910, the device 204 may generate a second hash value. As discussed with reference to FIG. 6, the query message 310 may be received by the device transceiver 602 and processed by the query message processor 606. The query message 310 may include the message identifier 800d. The second hash generator 302 may generate the second hash value using the message identifier 800d, the first hash value 224 and the IP address assigned to the device 204.

In step 912, the device 204 sends a response message 312 to the network management server 102. The response message 312 may include the response packet 802 as discussed with reference to FIG. 8B. Referring back to FIG. 6, the response message generator 608 may generate the response packet 802 which may be transmitted to the network management server 102 via the device transceiver 602.

In step 914, the network management server 102 may receive the response packet 802 and determine the device attributes from the payload 802e. Using the received device attributes and the vendor key 210 stored in the memory 208, the network management server 102 may generate a third hash value. For example, referring back to FIG. 4, the response message processor 406 may process the response packet 802 to determine various device attributes. The hash generator 306 may use these device attributes and the vendor key 210 retrieved using the device identifier 704 and optionally the device class 706 to generate the third hash value. For example, the hash generator 306 may generate the third hash value based on the value of the MAC address flag 710 as shown in equation (3) and equation (4). The hash generator 306 may further generate a fourth hash value using the third hash value, the message identifier 800d, and a current IP address of the device 204 as shown in equation (5).

In step 916, the network management server 102 may compare the fourth hash value generated by the hash generator 306, with the second hash value 804c received in the response packet 802. Referring back to FIG. 4, the device authenticator 308 may perform the comparison to determine if the fourth hash value computed by the network management server 102 matches the second hash value 804c computed by the device 204.

In step 918, the network management server 102 may authenticate the device 204 if there is a match and the device 204 has been positively identified. The device 204 may be allowed to operate in the network associated with network management server 102.

Figure 10:
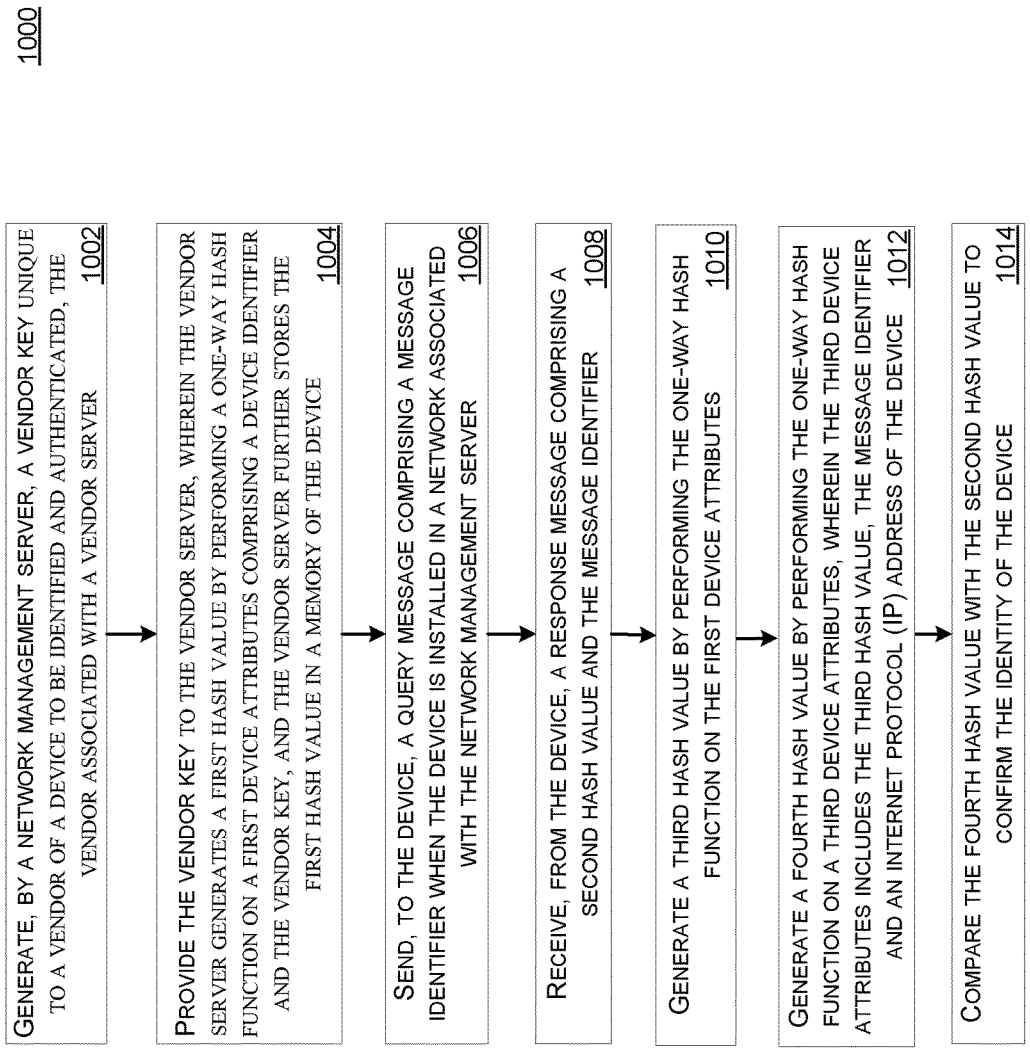
FIG. 10 illustrates a flow diagram for a method performed by a network management server for identification and authentication of a device in a network, in some embodiments of the disclosed technologies.

FIG. 10 illustrates a flow diagram 1000 for a method performed by a network management server for identification and authentication of a device in a network, in some embodiments of the disclosed technologies. The method 1000 may be performed by the network management server 102 to identify and authenticate the device 204.

In step 1002, the network management server may generate a vendor key unique to a vendor of a device that may need to be identified and authenticated. The vendor may be associated with a vendor server. As discussed with reference to FIG. 2, the network management server 102 may generate the vendor key 210 for a vendor of the device 204. The vendor may be associated with the vendor server 202.

In step 1004, the network management server may provide the vendor key to the vendor server, wherein the vendor server generates a first hash value by performing a one-way hash function on first device attributes comprising a device identifier and the vendor key. The vendor server further stores the first hash value in a memory of the device. As discussed with reference to FIG. 2, the network management server 102 may provide the vendor key 210 to the vendor server 202 using a secure method. The network management server 102 may also store the vendor key 210 in a secure location in the memory 208 along with the vendor attributes 214. The vendor server 202 may generate the first hash value 224 by performing a one-way hash function from the hash function identifier list 212, using the first device attributes 218 as shown in equation (1) and equation (2) based on the value of the MAC address flag 710. The vendor server 202 may also provision the device 204 with the first hash value 224 at a vendor location before the device 204 is shipped to be deployed in the network associated with the network management server 102.

In step 1006, the network management server may send, to the device, a query message comprising a message identifier when the device is installed in a network associated with the network management server. For example, when the device 204 is installed in the network associated with the network management server 102 using one of the ports, the network management server 102 may send the query message 310 to the device 204 to confirm the identity of the device 204, as discussed with reference to FIG. 3. The query message 310 may include the message identifier 800d, among other attributes.

In step 1008, the network management server may receive a response message comprising a second hash value and the message identifier. For example, the network management server 102 may receive the response message 312 from the device 204. The response message 312 may comprise the second hash value 804c generated by the device 204 and the message identifier 800d, among other attributes.

In step 1010, the network management server may generate a third hash value by performing a one-way hash function on the first device attributes. For example, the network management server 102 may generate the third hash value by performing a one-way hash function using the received device attributes from the response packet 802 as shown in equation (3) and equation (4) based on the value of the MAC address flag 710. The vendor key 210 may be retrieved from the memory 208 using the vendor identifier 702 and optionally the device class 706 received from the response packet 802.

In step 1012, the network management server may generate a fourth hash value by performing a one-way hash function on third device attributes. The third device attributes may include the third hash value, the message identifier, and an IP address of the device. For example, the network management server 102 may generate the fourth hash value using the third hash value, the message identifier 800d, and an IP address associated with the device 204. The IP address associated with the device 204 may be extracted from the socket based on the protocol version (e.g., IPv4 or IPv6) or from a network connection handle to the device.

In step 1014, the network management server may compare the fourth hash value with the second hash value to confirm the identity of the device. For example, the network management server 102 may compare the fourth hash value with the second hash value 804c received from the response packet 802. If there is a match, the device 204 can be positively identified.

Figure 11:
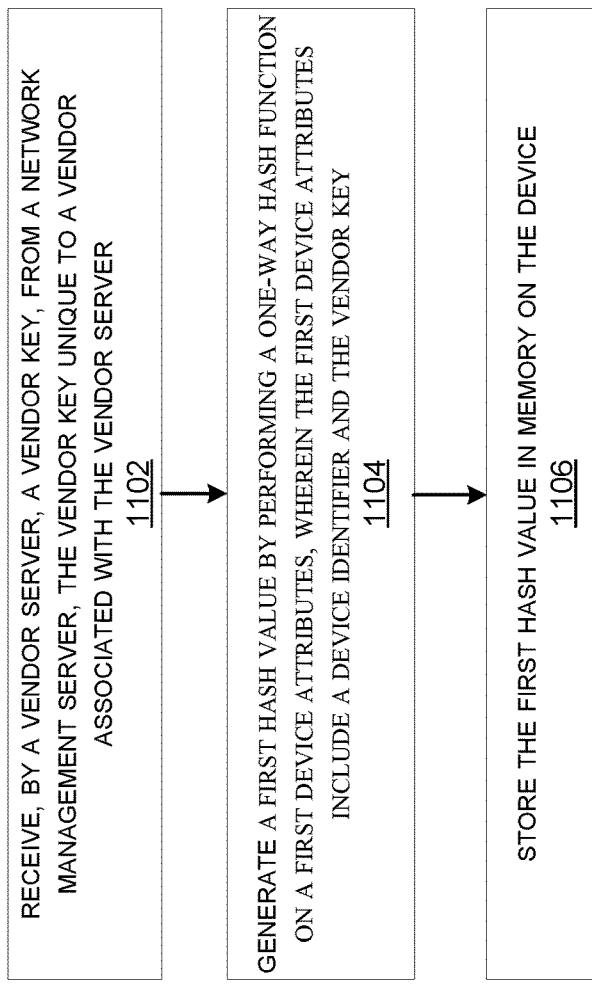
FIG. 11 illustrates a flow diagram for a method performed by a vendor server associated with a vendor of a device to be deployed in a network associated with a network management server, in some embodiments of the disclosed technologies.

FIG. 11 illustrates a flow diagram 1100 for a method performed by a vendor server associated with a vendor of a device to be deployed in a network associated with a network management server, in some embodiments of the disclosed technologies. The method 1100 may be performed by the vendor server 202 to provision the device 204 with a first hash value before the device 204 is deployed in the network.

In step 1102, the vendor server may receive a vendor key from a network management server. The vendor key may be unique to a vendor associated with the vendor server. Referring back to FIG. 2, the vendor sever 202 may receive the vendor key 210 from the network management server 102 using a secure method. The vendor key 210 may be unique to a vendor associated with the vendor server 202.

In step 1104, the vendor server may generate a first hash value by performing a one-way hash function on first device attributes, wherein the first device attributes include a device identifier and the vendor key. For example, the vendor server 202 may generate the first hash value 224 by performing a one-way hash function from the hash function identifier list 212 using the first device attributes 218 as shown in equation (1) and equation (2) based on the value of the MAC address flag 710.

In step 1106, the vendor server may store the first hash value within memory on the device. The vendor server 202 may store the first hash value 224 in a secure location in the memory 226. In some embodiments, a client application executing as a service or a daemon on the device 204 may have privileged access to the access restricted directory where the pre-computed first hash value 224 can be stored for it to read and respond. The vendor server 202 may program the device 204 with the first hash value 224 at the vendor location before the device is shipped for deployment in the network.

Figure 12:
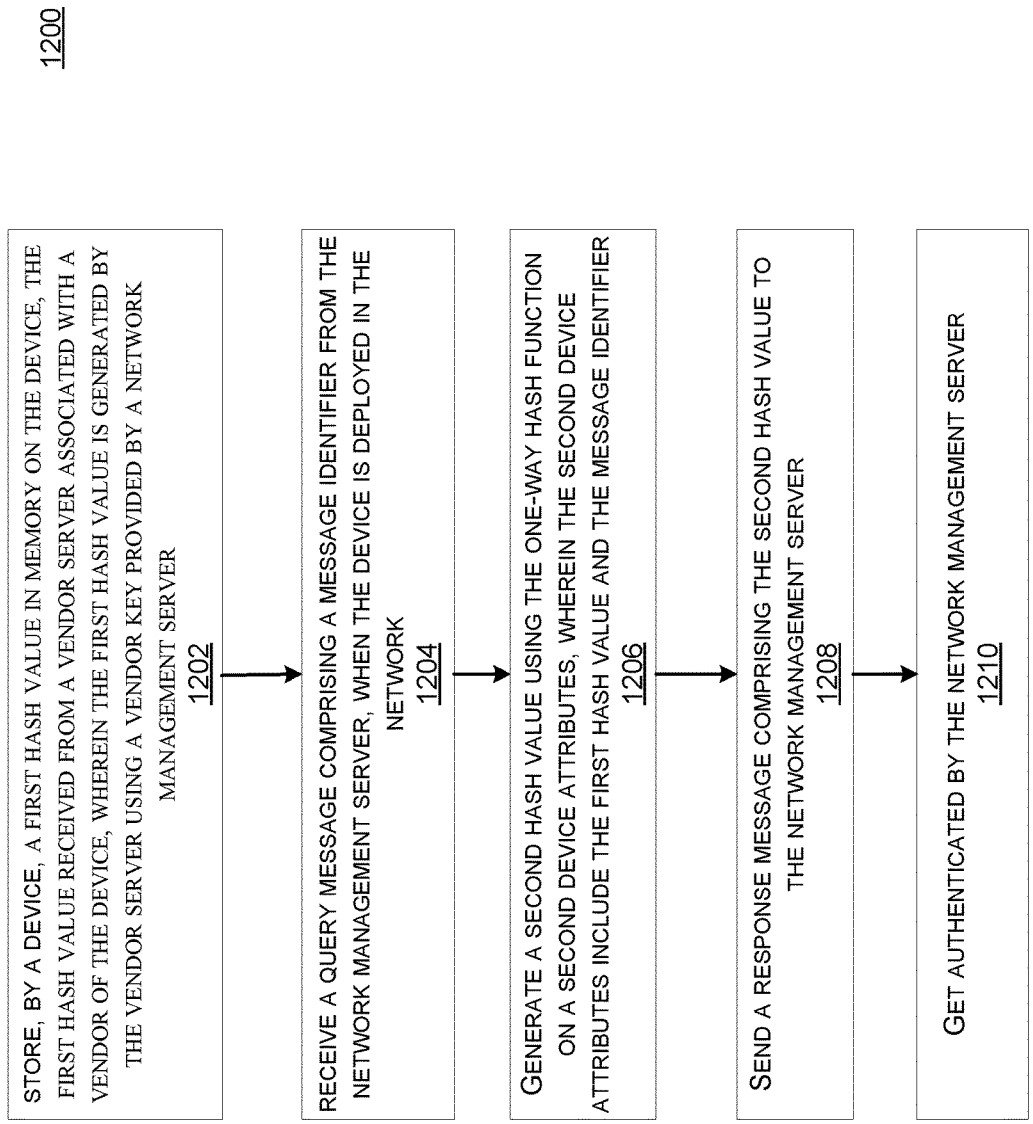
FIG. 12 illustrates a flow diagram for a method performed by a device to be deployed in a network associated with a network management server, in some embodiments of the disclosed technologies.

FIG. 12 illustrates a flow diagram 1200 for a method performed by a device to be deployed in a network associated with a network management server, in some embodiments of the disclosed technologies. The method 1200 may be performed by the device 204 before the device 204 is deployed in the network.

In step 1202, the device may store a first hash value within memory on the device. The first hash value may have been received from a vendor server associated with a vendor of the device. The first hash value may be generated by the vendor server by performing a one-way hash function on first device attributes, wherein the first device attributes include a device identifier for the device and a vendor key provided by the network management server. As discussed with reference to FIG. 3, the device 204 may receive the first hash value 224 from the vendor server 202 and may store the first hash value 224 in the memory 226 before the device 204 is deployed in the network.

In step 1204, the device may receive a query message comprising a message identifier from the network management server when the device is deployed in the network. For example, the query message 310 may be sent by network management server 102 to query the device 204 when the network management server 102 detects the device 204 on one of the ports. In some embodiments, the query message 310 may include a L3 network UDP port query to a particular port where the device may be detected. The query message 310 may include the message identifier 800d.

In step 1206, the device may generate a second hash value using the one-way hash function on second device attributes, wherein the second device attributes include the first hash value and the message identifier. The device 204 may generate the second hash value using the message identifier 800d, the first hash value 224 and an IP address assigned to the device 204.

In step 1208, the device may send a response message comprising the second hash value to the network management server. The device 204 may send a response message 312 to the network management server 102. The response message 312 may include the response packet 802 as discussed with reference to FIG. 8B.

In step 1210, the device may get authenticated by the network management server. The network management server 102 may authenticate the device 204 by comparing the second hash value with a hash value generated by the network management server 102, using the device attributes received in the response message. Based on the comparison the network management server 102 may authenticate the device 204.

Embodiments of the disclosed technologies provide a simple and lightweight network protocol for identification and authentication of vendor devices in a network. Additionally, use of a message identifier and an IP address in computing different hash values can help minimize unauthorized access to the network by rogue devices.

Figure 13:
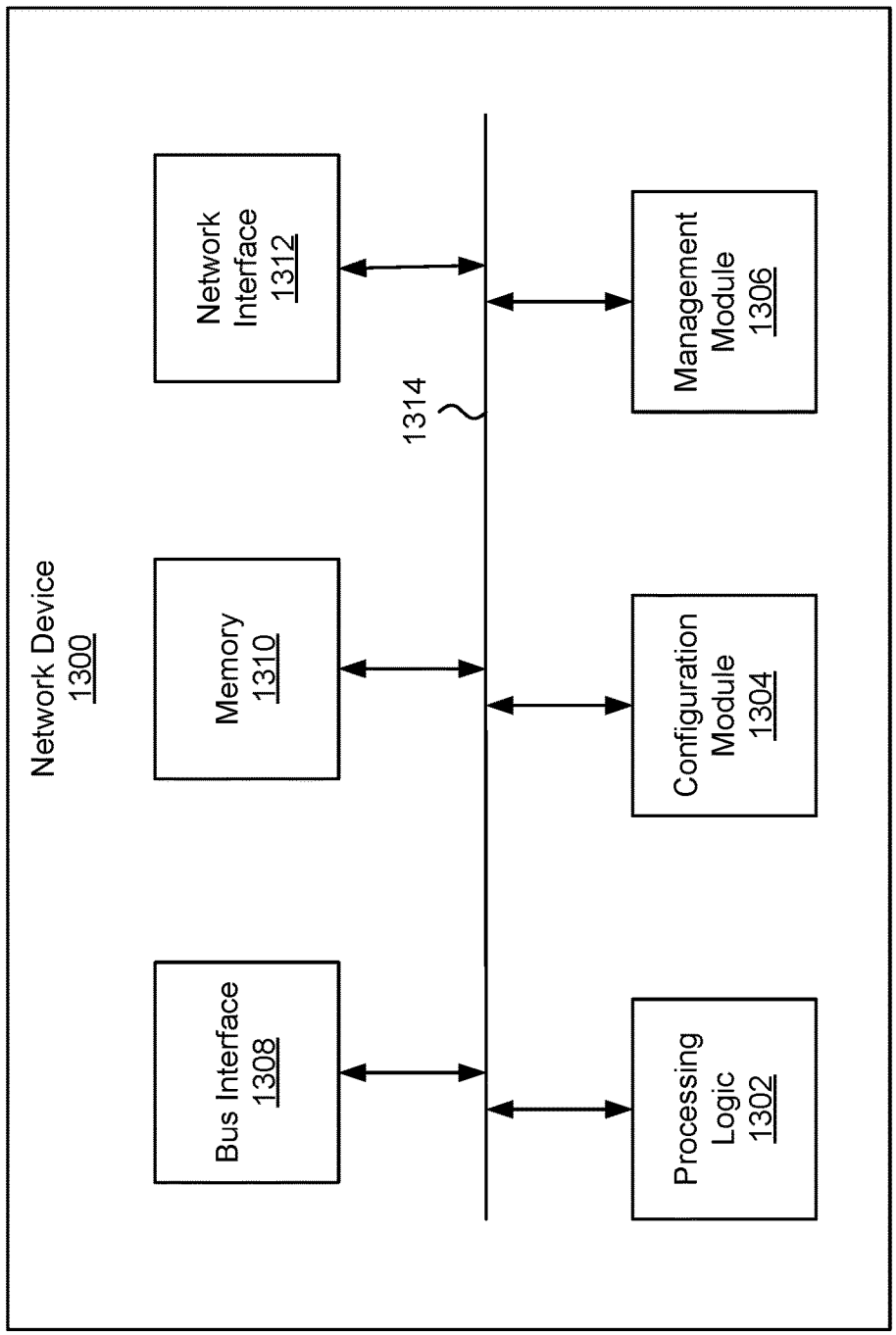
FIG. 13 illustrates an example of a network device, according to certain aspects of the disclosure.

FIG. 13 illustrates an example of a network device 1300. Functionality and/or several components of the network device 1300 may be used without limitation with other embodiments disclosed elsewhere in this disclosure, without limitations, e.g., in FIG. 1. A network device 1300 may facilitate processing of packets and/or forwarding of packets from the network device 1300 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1300 may be the recipient and/or generator of packets. In some implementations, the network device 1300 may modify the contents of the packet before forwarding the packet to another device. The network device 1300 may be a peripheral device coupled to another computer device, a switch, a router, or any other suitable device enabled for receiving and forwarding packets.

In one example, the network device 1300 may include processing logic 1302, a configuration module 1304, a management module 1306, a bus interface module 1308, memory 1310, and a network interface module 1312. These modules may be hardware modules, software modules, or a combination of hardware and software. In certain instances, modules may be interchangeably used with components or engines, without deviating from the scope of the disclosure. The network device 1300 may include additional modules, not illustrated here, such as components discussed with respect to the nodes disclosed in FIG. 14. In some implementations, the network device 1300 may include fewer modules. In some implementations, one or more of the modules may be combined into one module. One or more of the modules may be in communication with each other over a communication channel 1314. The communication channel 1314 may include one or more busses, meshes, matrices, fabrics, a combination of these communication channels, or some other suitable communication channel.

The processing logic 1302 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1302 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores, or processing threads executing on the same core may share certain resources, such as busses, level 1 (L1) caches, and/or level 2 (L2) caches. The instructions executed by the processing logic 1302 may be stored on a computer-readable storage medium, for example, in the form of a computer program. The computer-readable storage medium may be non-transitory. In some cases, the computer-readable medium may be part of the memory 1310.

The memory 1310 may include either volatile or non-volatile, or both volatile and non-volatile types of memory. The memory 1310 may, for example, include random access memory (RAM), read only memory (ROM), Electrically Erasable Programmable Read-Only Memory (EEPROM), flash memory, and/or some other suitable storage media. In some cases, some or all of the memory 1310 may be internal to the network device 1300, while in other cases some or all of the memory may be external to the network device 1300. The memory 1310 may store an operating system comprising executable instructions that, when executed by the processing logic 1302, provides the execution environment for executing instructions providing networking functionality for the network device 1300. The memory may also store and maintain several data structures and routing tables for facilitating the functionality of the network device 1300.

In some implementations, the configuration module 1304 may include one or more configuration registers. Configuration registers may control the operations of the network device 1300. In some implementations, one or more bits in the configuration register can represent certain capabilities of the network device 1300. Configuration registers may be programmed by instructions executing in the processing logic 1302, and/or by an external entity, such as a host device, an operating system executing on a host device, and/or a remote device. The configuration module 1304 may further include hardware and/or software that control the operations of the network device 1300.

In some implementations, the management module 1306 may be configured to manage different components of the network device 1300. In some cases, the management module 1306 may configure one or more bits in one or more configuration registers at power up, to enable or disable certain capabilities of the network device 1300. In certain implementations, the management module 1306 may use processing resources from the processing logic 1302. In other implementations, the management module 1306 may have processing logic similar to the processing logic 1302, but segmented away or implemented on a different power plane than the processing logic 1302.

The bus interface module 1308 may enable communication with external entities, such as a host device and/or other components in a computing system, over an external communication medium. The bus interface module 1308 may include a physical interface for connecting to a cable, socket, port, or other connection to the external communication medium. The bus interface module 1308 may further include hardware and/or software to manage incoming and outgoing transactions. The bus interface module 1308 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1308 may include the physical layer for any of these bus protocols, including a connector, power management, and error handling, among other things. In some implementations, the network device 1300 may include multiple bus interface modules for communicating with multiple external entities. These multiple bus interface modules may implement the same local bus protocol, different local bus protocols, or a combination of the same and different bus protocols.

The network interface module 1312 may include hardware and/or software for communicating with a network. This network interface module 1312 may, for example, include physical connectors or physical ports for wired connection to a network, and/or antennas for wireless communication to a network. The network interface module 1312 may further include hardware and/or software configured to implement a network protocol stack. The network interface module 1312 may communicate with the network using a network protocol, such as TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1300 may include multiple network interface modules, each configured to communicate with a different network. For example, in these implementations, the network device 1300 may include a network interface module for communicating with a wired Ethernet network, a wireless 802.11 network, a cellular network, an Infiniband network, etc.

The various components and modules of the network device 1300, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 14.

Figure 14:
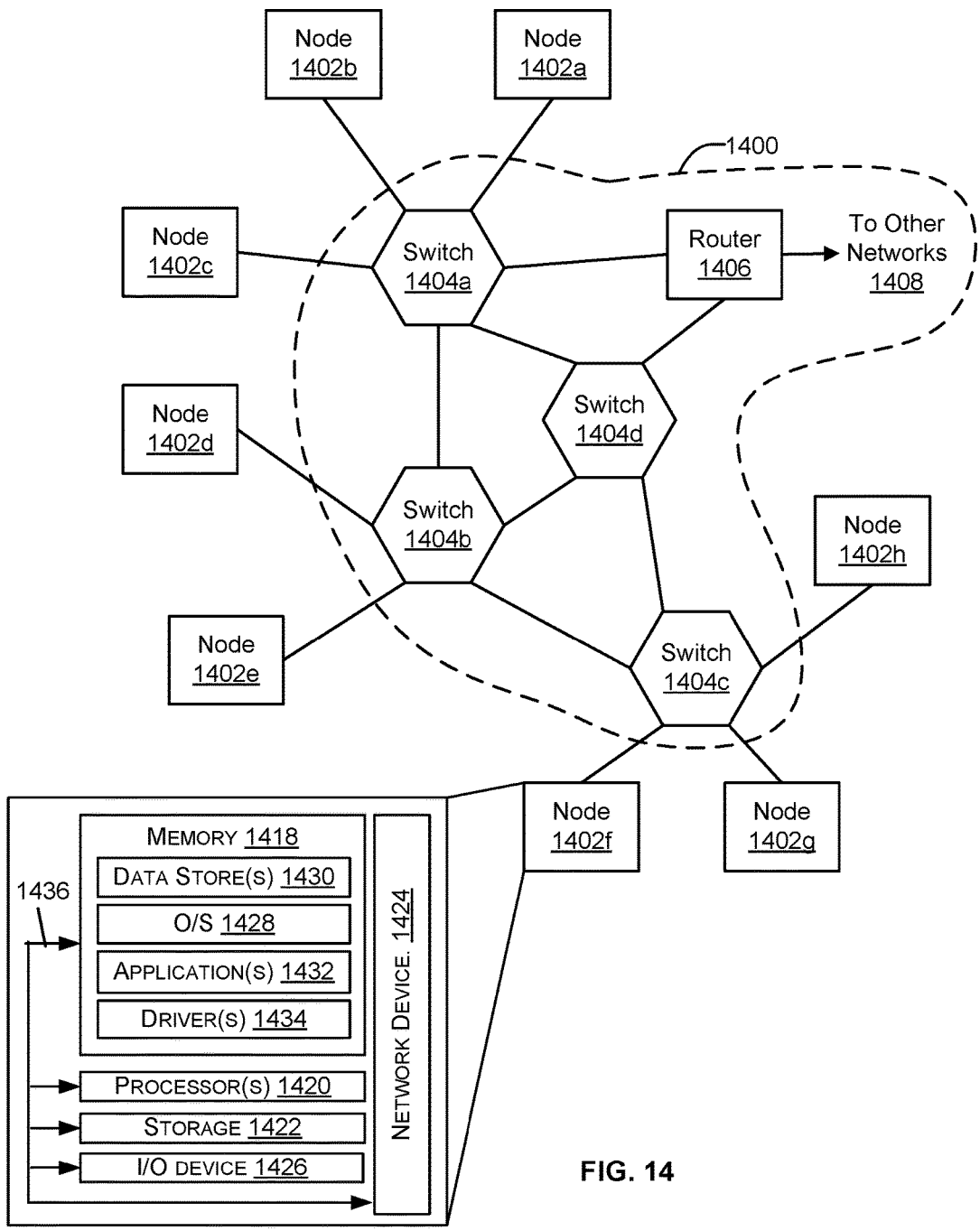
FIG. 14 illustrates an example architecture for features and systems described herein that includes one or more service provider computers and/or a user device connected via one or more networks, according to certain aspects of the disclosure.

FIG. 14 illustrates a network 1400, illustrating various different types of network devices 1300 of FIG. 13, such as nodes comprising the network device, switches and routers. In certain embodiments, the network 1400 may be based on a switched architecture with point-to-point links. As illustrated in FIG. 14, the network 1400 includes a plurality of switches 1404a-1404d, which may be arranged in a network. In some cases, the switches are arranged in a multi-layered network, such as a Clos network. A network device 1300 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1404a-1404d may be connected to a plurality of nodes 1402a-1402h and provide multiple paths between any two nodes.

The network 1400 may also include one or more network devices 1300 for connection with other networks 1408, such as other subnets, LANs, wide area networks (WANs), or the Internet, and may be referred to as routers 1406. Routers use headers and forwarding tables to determine the best path for forwarding the packets, and use protocols such as internet control message protocol (ICMP) to communicate with each other and configure the best route between any two devices.

In some examples, network(s) 1400 may include any one or a combination of many different types of networks, such as cable networks, the Internet, wireless networks, cellular networks and other private and/or public networks. Interconnected switches 1404a-1404d and router 1406, if present, may be referred to as a switch fabric, a fabric, a network fabric, or simply a network. In the context of a computer network, terms "fabric" and "network" may be used interchangeably herein.

Nodes 1402a-1402h may be any combination of host systems, processor nodes, storage subsystems, and I/O chassis that represent user devices, service provider computers, or third party computers.

User devices may include computing devices to access an application 1432 (e.g., a web browser or mobile device application). In some aspects, the application 1432 may be hosted, managed, and/or provided by a computing resources service or service provider. The application 1432 may allow the user(s) to interact with the service provider computer(s) to, for example, access web content (e.g., web pages, music, video, etc.). The user device(s) may be a computing device such as a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via other network(s) 1408. Additionally, the user device(s) may be part of the distributed system managed by, controlled by, or otherwise part of the service provider computer(s) (e.g., a console device integrated with the service provider computers).

The node(s) of FIG. 14 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1432 and/or cloud-based software services. These servers may be configured as part of an integrated, distributed computing environment. In some aspects, the service provider computer(s) may, additionally or alternatively, include computing devices such as a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1402a-1402h may include at least one memory 1418 and one or more processing units (or processor(s) 1420). The processor(s) 1420 may be implemented in hardware, computer-executable instructions, firmware, or combinations thereof. Computer-executable instruction or firmware implementations of the processor(s) 1420 may include computer-executable or machine-executable instructions written in any suitable programming language to perform the various functions described.

In some instances, the hardware processor(s) 1420 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1418 may store program instructions that are loadable and executable on the processor(s) 1420, as well as data generated during the execution of these programs. Depending on the configuration and type of the node(s) 1402a-1402h, the memory 1418 may be volatile (such as RAM) and/or non-volatile (such as ROM, flash memory, etc.). The memory 1418 may include an operating system 1428, one or more data stores 1430, one or more application programs 1432, one or more drivers 1434, and/or services for implementing the features disclosed herein.

The operating system 1428 may support nodes 1402a-1402h basic function, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1428 may also be a proprietary operating system.

The data stores 1430 may include permanent or transitory data used and/or operated on by the operating system 1428, application programs 1432, or drivers 1434. Examples of such data include web pages, video data, audio data, images, user data, and so on. The information in the data stores 1430 may, in some implementations, be provided over the network(s) 1408 to user devices 1404. In some cases, the data stores 1430 may additionally or alternatively include stored application programs and/or drivers. Alternatively or additionally, the data stores 1430 may store standard and/or proprietary software libraries, and/or standard and/or proprietary application user interface (API) libraries. Information stored in the data stores 1430 may be machine-readable object code, source code, interpreted code, or intermediate code.

The drivers 1434 include programs that may provide communication between components in a node. For example, some drivers 1434 may provide communication between the operating system 1428 and additional storage 1422, network device 1424, and/or I/O device 1426. Alternatively or additionally, some drivers 1434 may provide communication between application programs 1432 and the operating system 1428, and/or application programs 1432 and peripheral devices accessible to the service provider computer. In many cases, the drivers 1434 may include drivers that provide well-understood functionality (e.g., printer drivers, display drivers, hard disk drivers, Solid State Device drivers). In other cases, the drivers 1434 may provide proprietary or specialized functionality.

The service provider computer(s) or servers may also include additional storage 1422, which may include removable storage and/or non-removable storage. The additional storage 1422 may include magnetic storage, optical disks, solid state disks, flash memory, and/or tape storage. The additional storage 1422 may be housed in the same chassis as the node(s) 1402a-1402h or may be in an external enclosure. The memory 1418 and/or additional storage 1422 and their associated computer-readable media may provide non-volatile storage of computer-readable instructions, data structures, program modules, and other data for the computing devices. In some implementations, the memory 1418 may include multiple different types of memory, such as SRAM, DRAM, or ROM.

The memory 1418 and the additional storage 1422, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1418 and the additional storage 1422 are examples of computer storage media. Additional types of computer storage media that may be present in the node(s) 1402a-1402h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by node(s) 1402a-1402h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1402a-1402h may also include I/O device 1426, such as a keyboard, a mouse, a pen, a voice input device, a touch input device, a display, speakers, a printer, and the like. The node(s) 1402a-1402h may also include one or more communication channels 1436. A communication channel 1436 may provide a medium over which the various components of the node(s) 1402a-1402h can communicate. The communication channel or channels 1436 may take the form of a bus, a ring, a switching fabric, or a network.

The node(s) 1402a-1402h may also contain network device 1424 that allow the node(s) 1402a-1402h to communicate with a stored database, another computing device or server, user terminals and/or other devices on the network 1400. The network device 1424 of FIG. 14 may include similar components discussed with reference to the network device 1300 of FIG. 13.

In some implementations, the network device 1424 is a peripheral device, such as a PCI-based device. In these implementations, the network device 1424 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1308 may implement NVMe, and the network device 1424 may be connected to a computing system using a PCIe interface.

A PCI-based device may include one or more functions. A "function" describes operations that may be provided by the network device 1424. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers to control two different storage resources. In some implementations, a PCI-based device may have up to eight functions.

In some implementations, the network device 1424 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 13, FIG. 14, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system for confirming identity of a device in a network, comprising:
   a vendor server comprising:
      a vendor transceiver configured to receive, from a network management server, a vendor key unique to a vendor associated with the vendor server;
      a vendor processor configured to:
         generate a first hash value by performing a one-way hash function on first device attributes, wherein the first device attributes include a device identifier for the device to be deployed in the network and the vendor key; and
         store the first hash value in memory on the device;
   the network management server comprising:
      a network management transceiver configured to send, to the device, a query message comprising a message identifier;
   the device comprising:
      a device transceiver configured to receive the query message comprising the message identifier from the network management server;
      a device processor configured to generate a second hash value using the one-way hash function on a second device attributes, wherein the second device attributes include the first hash value, a first internet protocol (IP) address associated with the device, and the message identifier; and the device transceiver is further configured to transmit a response message comprising the second hash value to the network management server, wherein the network management transceiver is further configured to receive, from the device, the response message comprising the second hash value;

the network management server further comprising:
a network management processor configured to:
generate a third hash value by performing the one-way hash function on the first device attributes;
generate a fourth hash value by performing the one-way hash function on a third device attributes, wherein the third device attributes include the third hash value, a second IP address associated with the device, and the message identifier; and
compare the fourth hash value with the second hash value to confirm the identity of the device.

2. The system of claim 1, wherein the first device attributes further include one or more of a vendor identifier for the vendor of the device, a device class that the device belongs to, a hash function identifier for identifying the one-way hash function, or a media access control (MAC) address of the device.

3. The system of claim 1, wherein the first IP address is assigned to the device when the device is deployed in the network and the second IP address is obtained from the network by the network management server.

4. A server, comprising:
a transceiver configured to:
send, to a device, a query message comprising a message identifier to confirm an identity of the device; and
receive, from the device, a response message comprising a device hash value, wherein the device is provisioned by a vendor with a vendor hash value generated using a one-way hash function of a vendor key and a device identifier for the device, wherein the vendor hash value is used by the device to generate the device hash value using the one-way hash function of the vendor hash value and the message identifier; and
a processor configured to:
generate a first hash value by performing the one-way hash function on first device attributes, wherein the first device attributes include the device identifier for the device and the vendor key unique to the vendor of the device;
generate a second hash value by performing the one-way hash function on second device attributes, wherein the second device attributes include the first hash value and the message identifier; and
compare the second hash value with the device hash value to confirm the identity of the device.

5. The server of claim 4, wherein the first hash value is generated by further including one or more of a vendor identifier, a device class, or a media access control (MAC) address in the first device attributes prior to performing the one-way hash function for the first hash value.

6. The server of claim 4, wherein the second hash value is generated by further including a current internet protocol (IP) address of the device in the second device attributes prior to performing the one-way hash function for the second hash value.

7. The server of claim 4, wherein the response message further comprises one or more of a vendor identifier for the vendor of the device, a device-class that the device belongs to, the device identifier, a hash function identifier for identifying the one-way hash function, a media access control (MAC) address of the device or an internet protocol (IP) address for the device.

8. The server of claim 7, wherein the hash function identifier identifies the one-way hash function from an enumerated list of one-way hash functions sent by the server to the device and to a vendor server associated with the device.

9. The server of claim 8, wherein the enumerated list of one-way hash functions includes MD5, SHA-1 or SHA-2.

10. The server of claim 4, wherein the vendor key is securely transmitted to the vendor for provisioning the device before the device is deployed in a network managed by the server.

11. The server of claim 4, further comprising:
memory, wherein the vendor key is stored in the memory, and wherein the processor is further configured to retrieve the vendor key from the memory using the device identifier prior to generating the first hash value.

12. The server of claim 4, wherein the server is configured to communicate with the device via a network device.

13. A device comprising:
a memory configured to store a first hash value provisioned by a vendor by performing a one-way hash function on a first device attributes, wherein the first device attributes include a device identifier for the device and a vendor key unique to the vendor of the device;
a transceiver configured to receive a query message comprising a message identifier from a server;
a processor configured to generate a second hash value using the one-way hash function on a second device attributes, wherein the second device attributes include the first hash value and the message identifier; and
the transceiver is further configured to transmit, to a network management server, the second hash value in a response message, the network management server confirming identify of the device based at least in part on independently computing the first hash value and the second hash value using the one-way hash function and comparing the second hash value as computed to the second hash value received in the response message.

14. The device of claim 13, wherein the first hash value is generated and stored in the device by a vendor server associated with the vendor.

15. The device of claim 14, wherein the first hash value is generated by further including one or more of a vendor identifier, a device class, or a media access control (MAC) address in the first device attributes prior to performing the one-way hash function for the first hash value.

16. The device of claim 13, wherein the second hash value is generated by further including an internet protocol (IP) address of the device in the second device attributes prior to performing the one-way hash function for the second hash value.

17. The device of claim 13, wherein the transceiver is further configured to transmit in the response message one or more of a vendor identifier for the vendor of the device, a device-class that the device belongs to, the device identifier, a one-way hash function identifier for identifying the one-way hash function, a media access control (MAC) address of the device, or an IP address for the device.

18. The device of claim 17, wherein the one-way hash function identifier identifies the one-way hash function from an enumerated list of one-way hash functions sent by the server to the vendor and to the device.

19. The device of claim 17, wherein the memory is further configured to store one or more of the vendor identifier, the device-class, the device identifier, the one-way hash function identifier, the MAC address, or the IP address.

\* \* \* \* \*